US009363435B2

(12) United States Patent
Tsuchita

(10) Patent No.: US 9,363,435 B2
(45) Date of Patent: Jun. 7, 2016

(54) APPARATUS AND METHOD OF DETERMINING HOW TO PERFORM LOW-PASS FILTER PROCESSING AS A REDUCTION ASSOCIATION PROCESSING WHEN MOIRE IS SUPPRESSED IN A CAPTURED IMAGE REPRESENTED BY IMAGE CAPTURE DATA ACCORDING TO AN ARRAY OF COLOR FILTERS AND WHEN THE MOIRE APPEARS IN THE REDUCED IMAGE AFTER PROCESSING THE REDUCTION PROCESSING ON THE IMAGE PICKUP DATA, ON THE BASIS OF AN ACQUISITION RESULT OF THE SHOOTING CONDITION DATA

(71) Applicant: FUJIFILM Corporation, Tokyo (JP)

(72) Inventor: Akiyoshi Tsuchita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/560,586

(22) Filed: Dec. 4, 2014

(65) Prior Publication Data
US 2015/0146049 A1 May 28, 2015

Related U.S. Application Data

(63) Continuation of application No. PCT/JP2013/061870, filed on Apr. 23, 2013.

(30) Foreign Application Priority Data

Jun. 8, 2012 (JP) ................................. 2012-130968

(51) Int. Cl.
*H04N 5/235* (2006.01)
*H04N 5/217* (2011.01)
(Continued)

(52) U.S. Cl.
CPC .......... *H04N 5/23229* (2013.01); *G06T 3/4015* (2013.01); *G06T 5/20* (2013.01); *H04N 5/23235* (2013.01); *H04N 9/07* (2013.01); *G06T 2207/10024* (2013.01); *G06T 2207/20024* (2013.01); *G06T 2207/20182* (2013.01); *H04N 9/045* (2013.01); *H04N 2209/046* (2013.01)

(58) Field of Classification Search
CPC ..... H04N 5/361; H04N 5/3575; H04N 5/378; H04N 9/045; G06T 5/001
USPC ........................................ 348/222.1, 241–251
See application file for complete search history.

(56) References Cited

U.S. PATENT DOCUMENTS

| 5,418,899 A | 5/1995 | Aoki et al. |
| 2002/0118019 A1 | 8/2002 | Nomura |

(Continued)

FOREIGN PATENT DOCUMENTS

| JP | 5-328106 A | 12/1993 |
| JP | 2000-268168 A | 9/2000 |

(Continued)

OTHER PUBLICATIONS

International Preliminary Examination Report (PCT/IPEA/409 and PCT/IPEA/416), issued in PCT/JP2013/061870, dated Oct. 1, 2014.

(Continued)

*Primary Examiner* — Sinh Tran
*Assistant Examiner* — Selam T Gebriel
(74) *Attorney, Agent, or Firm* — Birch, Stewart, Kolasch & Birch, LLP

(57) ABSTRACT

An image reduction processing section 16 includes a data acquisition section 70 that acquires whether shooting condition data is included in image capture data (including image pickup data) 30 and contents of the shooting condition data, and reduction processing discrimination unit for discriminating at least any of whether reduction association processing (such as low-pass filter processing) associated with reduction processing of generating reduced image data from the image pickup data is executed, a processing parameter (such as a cutoff frequency of low-pass filter processing) of the reduction association processing, and a processing parameter (such as a reduction ratio) of the reduction processing, on the basis of an acquisition result of the shooting condition data. The shooting condition data includes information on the presence or absence of the optical low-pass filter and information on the array of the color filters.

21 Claims, 21 Drawing Sheets

(51) Int. Cl.
*H04N 5/232* (2006.01)
*H04N 9/07* (2006.01)
*G06T 3/40* (2006.01)
*G06T 5/20* (2006.01)
*H04N 9/04* (2006.01)

(56) References Cited

U.S. PATENT DOCUMENTS

2008/0278596 A1* 11/2008 Machida ............... H04N 5/335 348/222.1
2012/0293696 A1* 11/2012 Tanaka .................. H04N 9/045 348/280

FOREIGN PATENT DOCUMENTS

| | | |
|---|---|---|
| JP | 2002-262094 A | 9/2002 |
| JP | 2002-369036 A | 12/2002 |
| JP | 2003-61034 A | 2/2003 |
| JP | 2005-56006 A | 3/2005 |

OTHER PUBLICATIONS

International Search Report, issued in PCT/JP2013/061870, dated May 21, 2013.
Written Opinion of the International Searching Authority, issued in PCT/JP2013/061870, dated May 21, 2013.

* cited by examiner

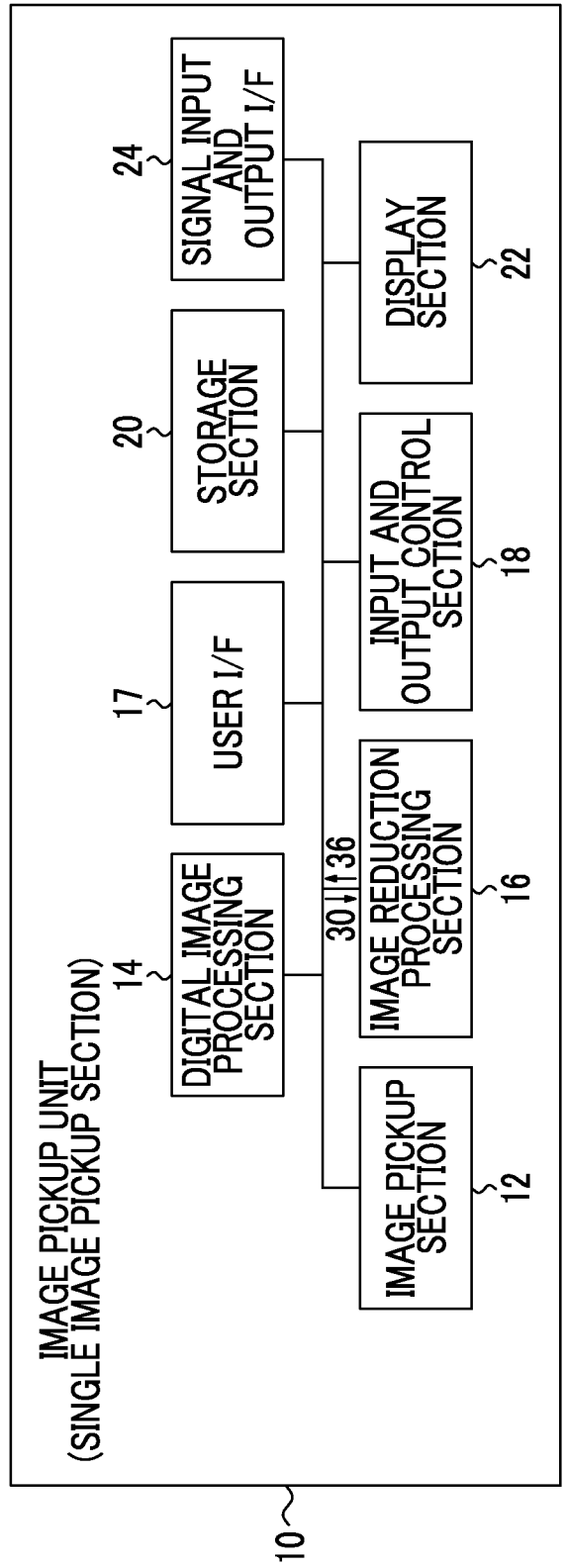

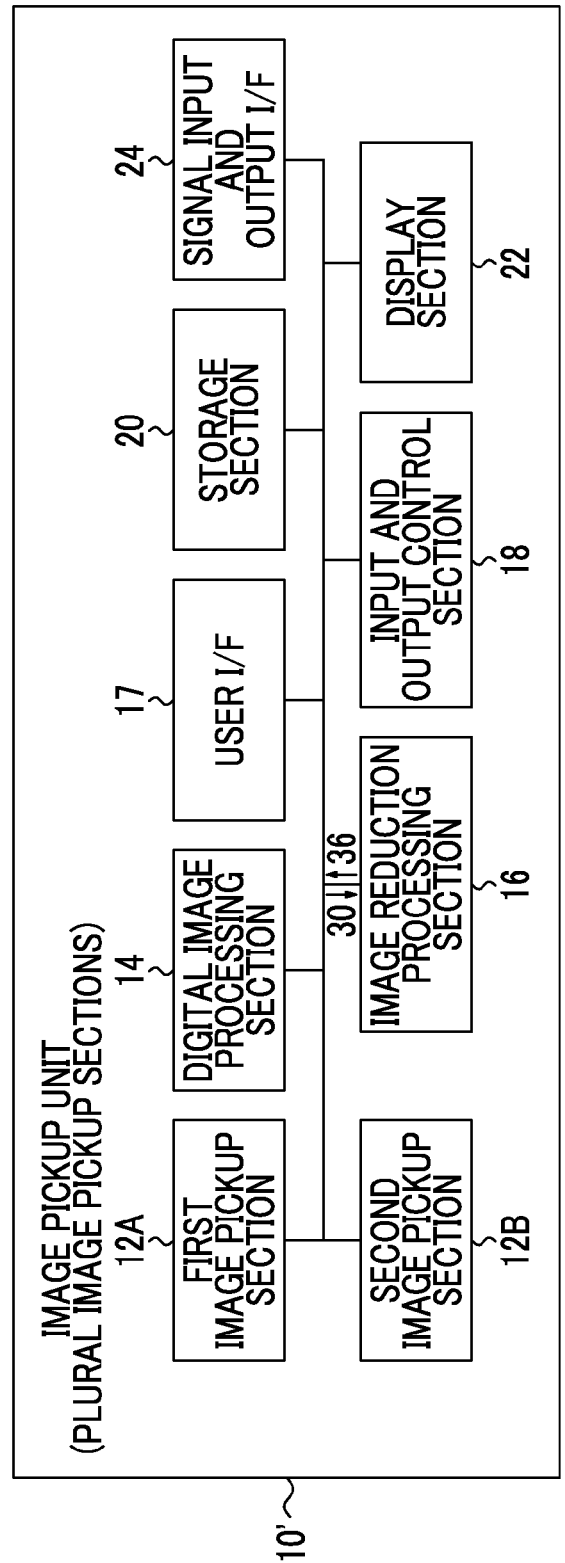

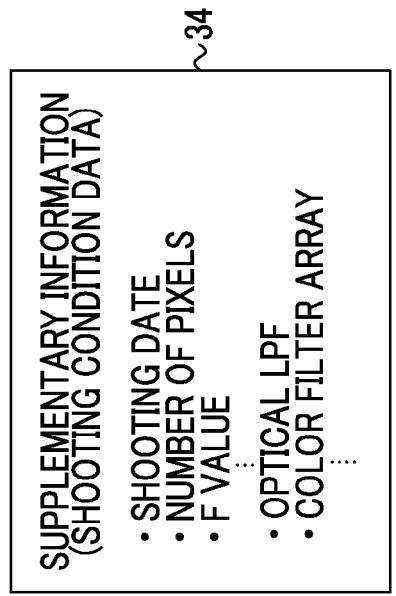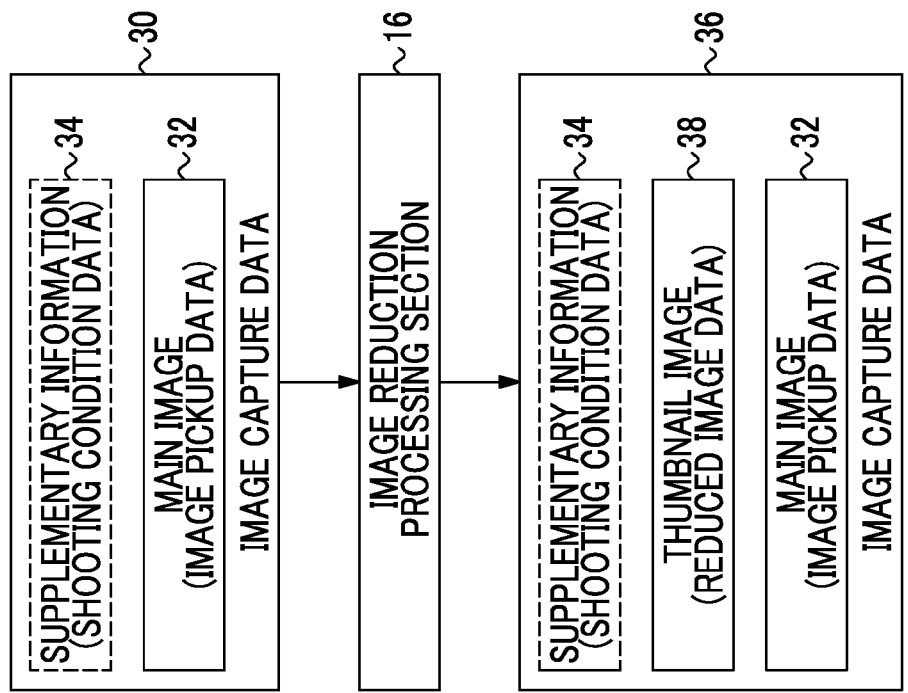

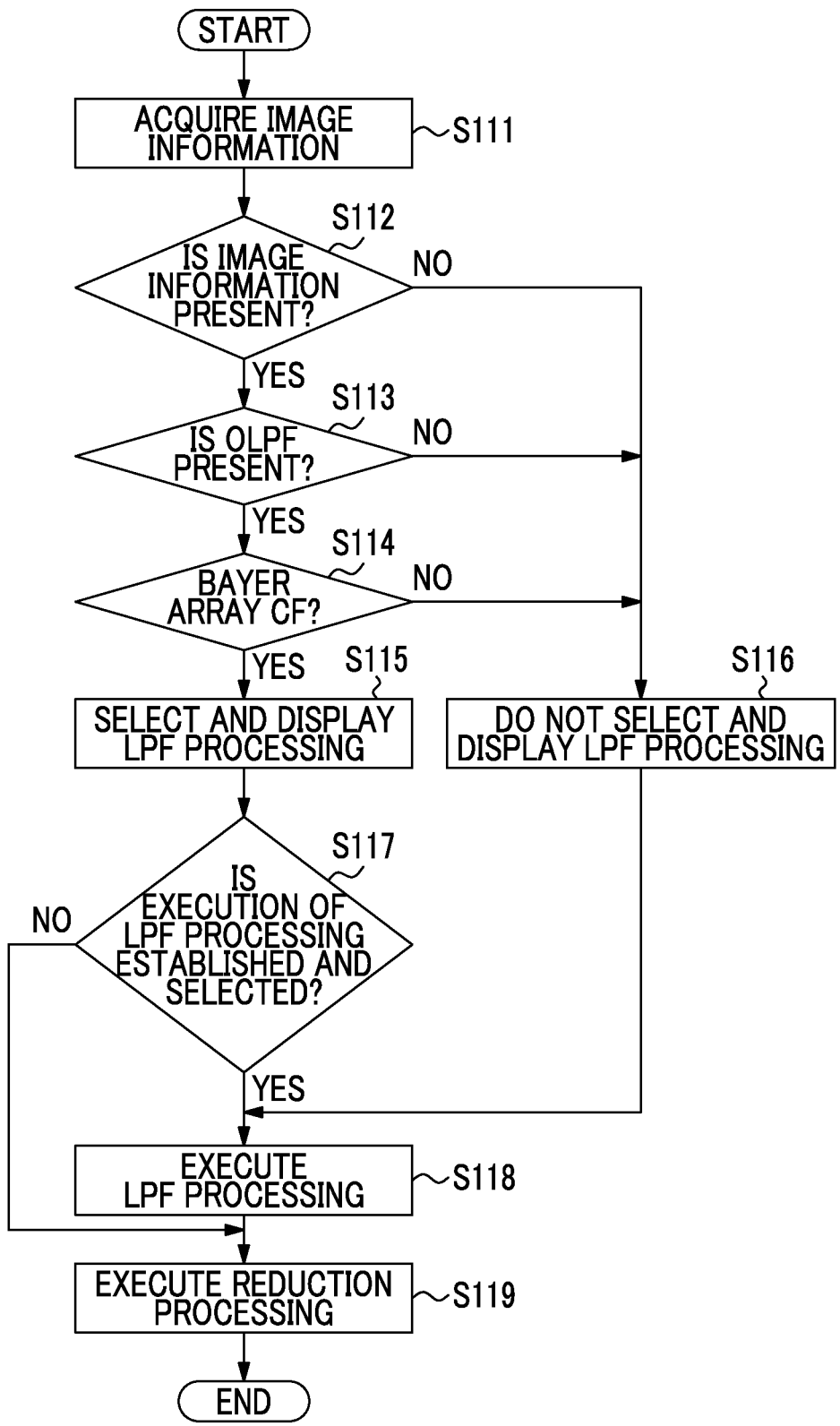

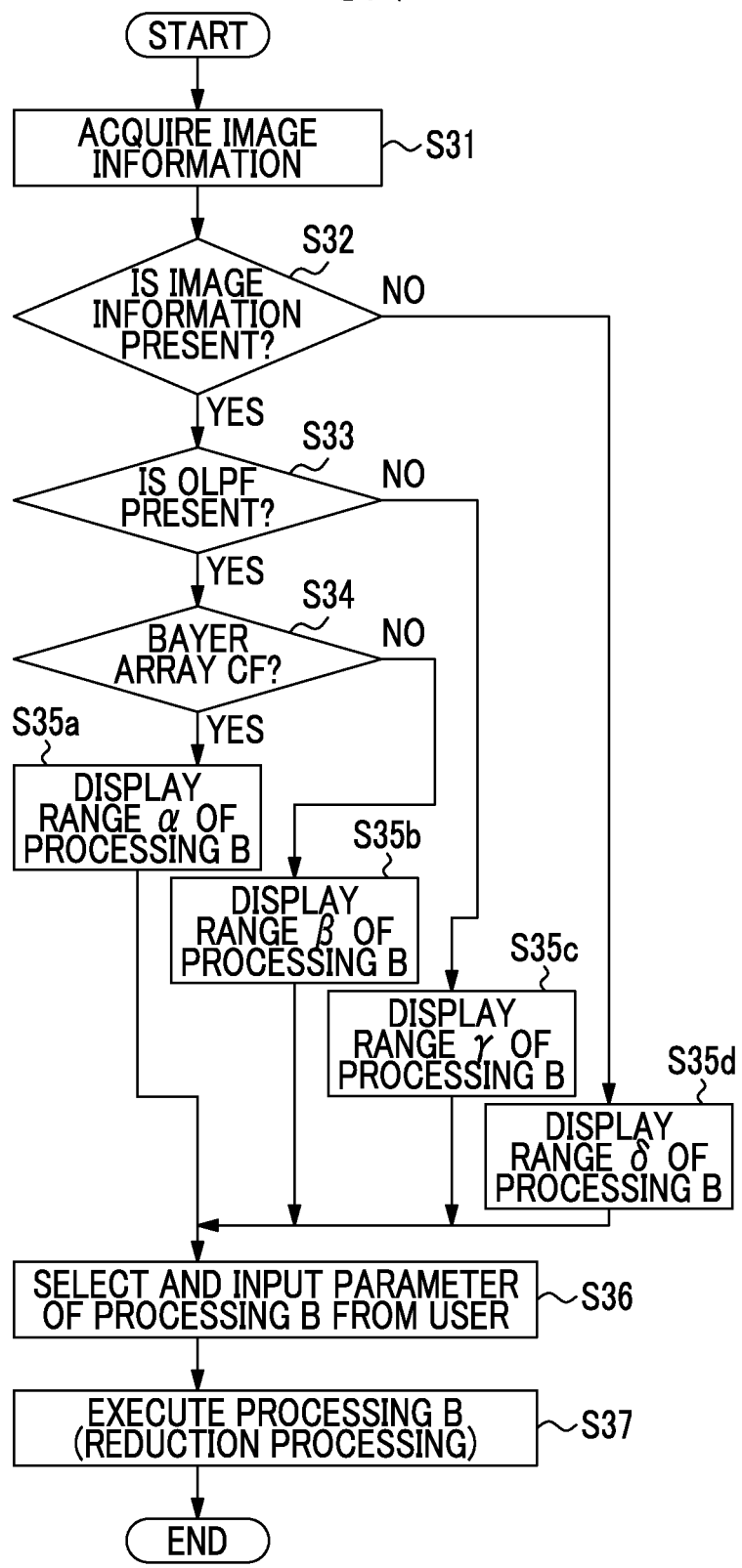

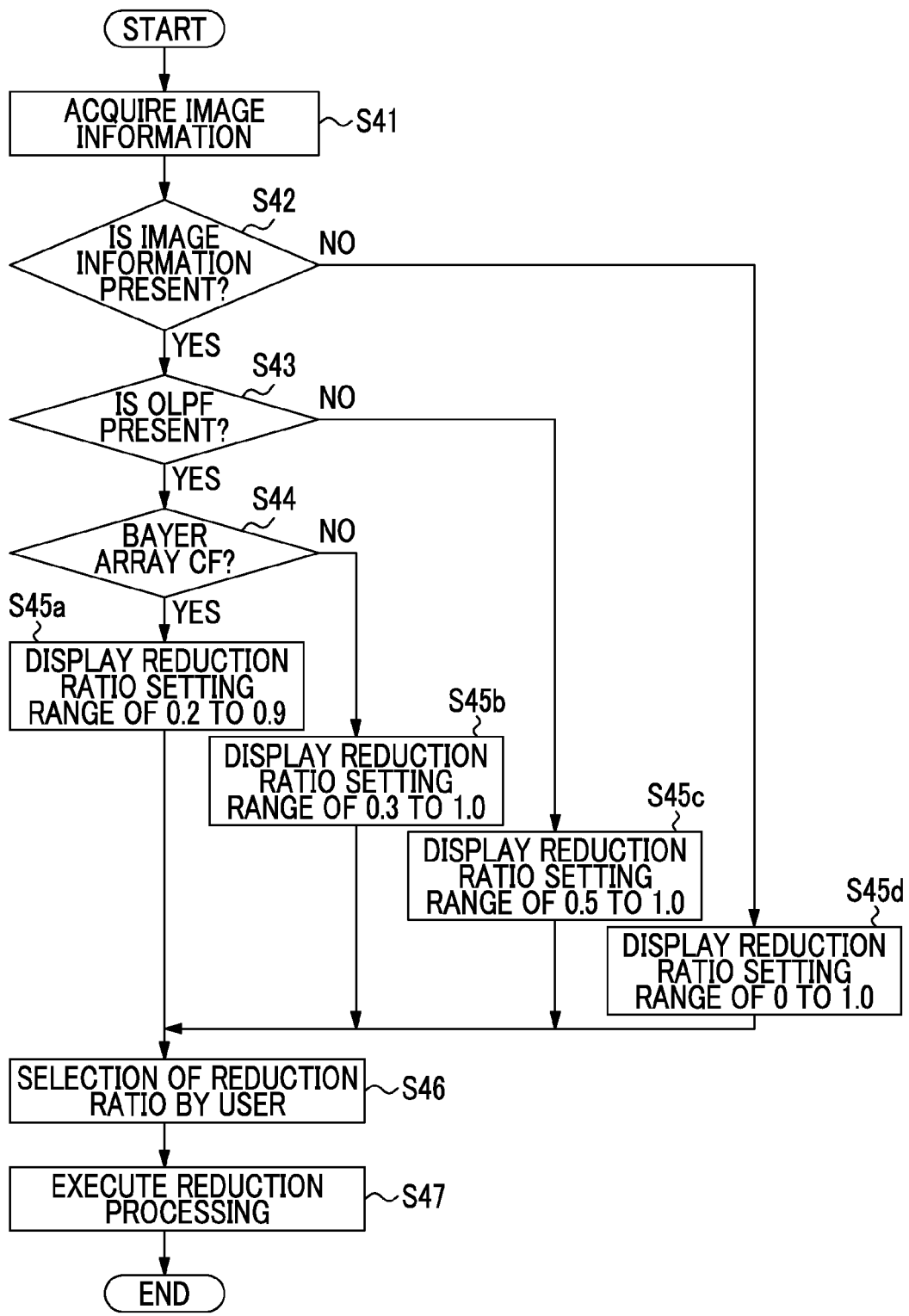

APPARATUS AND METHOD OF DETERMINING HOW TO PERFORM LOW-PASS FILTER PROCESSING AS A REDUCTION ASSOCIATION PROCESSING WHEN MOIRE IS SUPPRESSED IN A CAPTURED IMAGE REPRESENTED BY IMAGE CAPTURE DATA ACCORDING TO AN ARRAY OF COLOR FILTERS AND WHEN THE MOIRE APPEARS IN THE REDUCED IMAGE AFTER PROCESSING THE REDUCTION PROCESSING ON THE IMAGE PICKUP DATA, ON THE BASIS OF AN ACQUISITION RESULT OF THE SHOOTING CONDITION DATA

CROSS REFERENCE TO RELATED APPLICATIONS

This application is a Continuation of PCT International Application No. PCT/JP2013/061870 filed on Apr. 23, 2013, which claims priority under 35 U.S.C. §119(a) to Patent Application No. 2012-130968 filed in Japan on Jun. 8, 2012, all of which are hereby expressly incorporated by reference into the present application.

BACKGROUND OF THE INVENTION

1. Field of the Invention

The present invention relates to an image processing device, an image pickup device, an image processing method and a program, and particularly relates to image reduction processing of generating a reduced image from a captured image.

2. Description of the Related Art

In a field of an image pickup device such as a camera, digital captured images are acquired by an image pickup element (CCD, CMOS or the like) in which color filters such as RGB filters are arranged. Image quality degradation such as so-called moire, blurring, texture disarray, a false color, or aliasing distortion may be conspicuous in the captured image acquired in this manner. Particularly, the image quality degradation may appear conspicuously in a reduced image generated from the captured image. Therefore, various techniques for suppressing image degradation such as moire are proposed. For example, JP1993-328106A (JP-H05-328106A) discloses a technique for performing smoothing according to an image type and a variable magnification by switching a low-pass filter depending on a detection result of an edge region, a variable magnification, and user's designated information, to thereby generate a variable magnification image having little moire or blurring.

In addition, JP2005-056006A discloses a technique for fetching an image to be processed which is composed of a plurality of pieces of pixel data and randomly moves positions of the plurality of pieces of pixels data for each pixel data within a neighboring region of each pixel data, to thereby reduce moire regardless of a period having a repeated feature such as a pattern or a halftone dot.

SUMMARY OF THE INVENTION

As in the technique disclosed in JP1993-328106A (JP-H05-328106A), it is effective to remove a component having a high spatial frequency (high frequency component) in order to suppress image degradation such as moire, and a low-pass filter (LPF) is generally used. As such a low-pass filter, the utilization of an optical low-pass filter (OLPF) that optically cuts a high frequency component in light with which an image pickup element is irradiated, in addition to a low-pass filter for signal processing, has progressed.

On the other hand, even when the low-pass filter is not used by contriving the array pattern of color filters, it is possible to acquire a captured image in which image degradation such as moire is sufficiently suppressed. Therefore, it is also possible to acquire a captured image having a further improvement in the sense of resolution without positively using the optical low-pass filter depending on the array pattern of the color filters, and without losing a high frequency component.

However, even in a case where image degradation such as moire or image aliasing is not conspicuous in the captured image when the captured image includes a high frequency component, image degradation such as moire or image aliasing may be conspicuous in a reduced image obtained by a process of reducing the captured image, due to the high frequency component.

In this manner, the configuration and function of an image pickup device are also diversified depending on the presence or absence of the optical low-pass filter or the use of the color filters having various array patterns. However, in the techniques of the related art disclosed in JP1993-328106A (JP-H05-328106A) and JP2005-056006A, it is difficult to perform appropriate image reduction processing corresponding to the above-mentioned diversification.

For example, in the technique disclosed in JP1993-328106A (JP-H05-328106A), the type of the low-pass filter is switched depending on the variable magnification, the type of an image, or the like, but processing for a case where the presence or absence of the optical low-pass filter or the array pattern of the color filters is changed is not disclosed and not suggested in JP1993-328106A (JP-H05-328106A).

In addition, in JP2005-056006A, a moire reduction processing technique is also disclosed, but moire reduction processing is not optimized depending on the presence or absence of the optical low-pass filter or the array pattern of the color filters. Therefore, when the same image reduction processing is performed by the moire reduction processing technique of JP2005-056006A on, for example, a captured image obtained color filters having a Bayer array and a captured image obtained through color filters having another pattern array designed to prevent moire or the like from occurring, there may be the possibility of image degradation such as moire not being conspicuous in one reduced image.

The present invention is contrived in view of such circumstances, the object thereof is to provide a technique capable of performing image reduction processing appropriately corresponding to the presence or absence of an optical low-pass filter and color filters having various array patterns, and capable of generating a reduced image in which image degradation such as moire is not conspicuous.

According to an aspect of the present invention, there is provided an image processing device to which image capture data including image pickup data is input, including: a data acquisition unit configured to discriminate whether shooting condition data is included in the image capture data to be input, and acquiring contents of the shooting condition data when it is discriminated that the shooting condition data is included in the image capture data to be input; and a reduction processing determination unit configured to determine whether reduction association processing associated with reduction processing of generating reduced image data from the image pickup data is executed, a processing parameter of the reduction association processing, and a processing parameter of the reduction processing, on the basis of an acquisition result of the shooting condition data by the data acquisition unit, wherein the shooting condition data includes information on the presence or absence of an optical low-pass filter at the time of the creation of the image pickup data and information on an array of color filters of an image pickup section used at the time of the creation of the image pickup data, wherein the reduction processing determination unit determines to process low-pass filter processing as the reduction association processing when moire is suppressed in a captured image represented by the image capture data according to the array of color filters, and when moire is appeared in a reduced image after processing the reduction processing on the image pickup data, on the basis of an acquisition result of the shooting condition data.

According to the present aspect, it is possible to determine at least any of whether the reduction association processing is executed, the processing parameter of the reduction association processing, and the processing parameter of the reduction processing, on the basis of the information on the presence or absence of an optical low-pass filter. Thereby, it is possible to optimize the reduction association processing and the reduction processing depending on the presence or absence of the optical low-pass filter.

Meanwhile, the term "reduction association processing" as used herein refers to a concept in which the entirety of processing associated with the reduction processing of the image pickup data can be included, and includes processing capable of improving the quality of the reduced image obtained by the reduction processing. Specifically, low-pass filter processing of removing a high frequency component included in the image pickup data or another processing is included in the reduction association processing. Therefore, the "processing parameter of the reduction association processing" includes, for example, a range (cutoff frequency range) of a high frequency component capable of being removed by the low-pass filter.

In addition, the term "reduction processing" refers to a concept in which the entirety of processing of reducing the image size of the image pickup data can be included, and includes image processing of acquiring a reduced image in which the number of lateral pixels and the number of longitudinal pixels of an image reproduced by the image pickup data are reduced. For example, the reduction processing includes image processing of generating image data for a reduced image (such as a thumbnail image) on the basis of VGA, SVGA, XGA, SXGA, UXGA, QXGA, a full-size image (image of a maximum size capable of being captured by an image pickup element), or image pickup data capable of reproducing images of other sizes. Therefore, the "processing parameter of the reduction processing" includes, for example, a reduction ratio in the reduction processing or a processing parameter of reduction interpolation processing. Meanwhile, the present aspect is particularly effective for the reduction processing to a size by which image degradation such as moire has a tendency to be conspicuous in the reduced image, but the size of the image pickup data and the size of the reduced image are not particularly limited.

In addition, the term "optical low-pass filter" refers to a filter element that optically cuts a high frequency component of light, and can be appropriately arranged at a position where a high frequency component can be cut from light with which the image pickup element is irradiated. Meanwhile, the information on the presence or absence of the optical low-pass filter may be directly included in the shooting condition data, and other information such as a model name capable of indirectly acquiring the information on the presence or absence of the optical low-pass filter may be included in the shooting condition data, for example, as in a case where the presence or absence of the optical low-pass filter is determined for each model of the image pickup device.

According to another aspect of the present invention, there is provided an image processing device, including: when moire is suppressed in a captured image represented by the image capture data according to the array of color filters, and when moire is appeared in a reduced image after processing the reduction processing on the image pickup data, is that when there is the high probability of the image capture data including many high frequency components.

According to the present aspect, it is possible to determine at least any of whether the reduction association processing is executed, the processing parameter of the reduction association processing, and the processing parameter of the reduction processing, on the basis of the information on the arrays of the color filter. Thereby, it is possible to optimize the reduction association processing and the reduction processing depending on the characteristics of the array pattern of the color filters.

Meanwhile, the term "color filter" refers to a filter element for determining the intensity of light for each color by passing the light at the time of the irradiation of the image pickup element, and a primary color filter (red, green, blue, or the like) or a complementary color filter (cyan, magenta, yellow, green, or the like) can be used as the color filter. Meanwhile, the array pattern and constituent color elements of the color filters are not particularly limited. Meanwhile, the information on the array of the color filter may be directly included in the shooting condition data, and other information such as a model name capable of indirectly acquiring the information on the array of the color filters may be included in the shooting condition data, for example, as in a case where the array of the color filters is determined for each model of the image pickup device.

Preferably, the reduction association processing is low-pass filter processing for the image pickup data.

According to the present aspect, it is possible to perform the reduction processing after a high frequency component is removed from the image pickup data by the low-pass filter processing. Thereby, it is possible to further prevent image degradation such as moire from occurring in the reduced image obtained by the reduction processing.

Preferably, the processing parameter of the reduction processing is a reduction ratio in the reduction processing.

According to the present aspect, it is possible to perform the reduction processing of the image pickup data, using the reduction ratio depending on the shooting condition data (information on the presence or absence of the optical low-pass filter or the array of the color filters). Thereby, it is possible to further prevent image degradation such as moire from occurring in the reduced image obtained by the reduction processing.

Preferably, the processing parameter of the reduction processing is a processing parameter of interpolation processing in the reduction processing.

According to the present aspect, it is possible to perform the interpolation processing of the reduction processing, using the processing parameter shooting condition data (information on the presence or absence of the optical low-pass filter or the array of the color filters). Thereby, it is possible to further prevent image degradation such as moire from occurring in the reduced image obtained by the reduction processing. Meanwhile, the interpolation processing as used herein is not particularly limited, and it is possible to adopt any interpolation processing capable of obtaining desired reduced image data.

Such interpolation processing includes, for example, a nearest neighbor method, a bi-linear interpolation method, a bi-cubic convolution interpolation method, a spline interpolation method, or other interpolation processing methods.

Preferably, the interpolation processing is based on a spline interpolation processing method, and the processing parameter of the interpolation processing is a spline interpolation coefficient.

As in the present aspect, image degradation such as moire is not very likely to occur by performing the reduction processing using the interpolation processing based on the spline interpolation processing method which is excellent in interpolation reproducibility, and thus it is possible to generate the image data of the reduced image having an excellent quality.

The spline interpolation processing method is an already known method, but the interpolation method is not particularly limited. Therefore, it is also possible to perform the reduction processing using, for example, the spline interpolation processing method disclosed in JP1997-050515A (JP-H09-050515A).

Preferably, the image capture data including the image pickup data imaged and created by a plurality of image pickup sections including at least a first image pickup section and a second image pickup section is input to the image processing device, and the reduction processing determination unit determines at least any of whether the reduction association processing is executed, the processing parameter of the reduction association processing, and the processing parameter of the reduction processing so that an image quality due to the reduced image data after the reduction processing falls within a predetermined allowable range between the image capture data imaged and created by the first image pickup section and the image capture data imaged and created by the second image pickup section.

According to the present aspect, when the image capture data imaged and created by a plurality of image pickup sections is input to the image processing device, at least any of whether the reduction association processing is executed, the processing parameter of the reduction association processing, and the processing parameter of the reduction processing is determined so that an image quality after the reduction processing falls within a predetermined allowable range between the image capture data imaged and created by the first image pickup section and the image capture data imaged and created by the second image pickup section. Therefore, even when image-pickup capabilities between the plurality of image pickup sections are different from each other, it is possible to generate a reduced image having a uniform quality.

Meanwhile, the wording "quality of the reduced image after the reduction processing falls within a predetermined allowable range" as used herein refers to a range in which the quality of the reduced image obtained by the reduction processing falls within a predetermined allowable range, and unit that, for example, various parameters serving as a factor for the image degradation (such as moire) of the reduced image lie within a predetermined allowable range. Such a "image quality of the reduced image" includes, for example, a spatial frequency, the amount of chroma, or the like.

In addition, the term "image pickup section" refers to a concept in which various appliances which contribute to the generation of the image pickup data can be included. The so-called image pickup element itself can be treated as the image pickup section, and the entire configuration including lenses that guide light to the image pickup element can also be treated as the image pickup section. Therefore, the the present aspect can be applied to an image processing device to which image capture data including image pickup data imaged and created by a different image pickup element, a different lens, or an image pickup device having a different configuration between the lens and the image pickup element is input.

Preferably, the image processing device includes reduction association processing unit configured to perform the reduction association processing in accordance with a determination result of the reduction processing determination unit.

According to the present aspect, the reduction association processing of the image pickup data can be performed by the reduction association processing unit on the basis of whether the reduction association processing associated with the reduction processing of the image pickup data determined in accordance with the shooting condition data is is executed or the determination result of the processing parameter of the reduction association processing. Therefore, the reduction association processing is performed when it is determined that the reduction association processing is not required from the shooting condition data, and the reduction association processing can be performed by the processing parameter suitable for the shooting condition data.

Preferably, the image processing device includes reduction processing unit for performing the reduction processing in accordance with the determination result of the reduction processing determination unit.

According to the present aspect, the reduction processing of the reduction processing unit can be performed on the basis of the processing parameter of the reduction processing determined in accordance with the shooting condition data. Therefore, the reduction processing can be performed by the processing parameter suitable for the shooting condition data.

Preferably, display unit configured to display a determination result of the reduction processing determination unit is further included.

According to the present aspect, a user can confirm the determination result of the reduction processing determination unit through the display of the display unit. Here, a display method of the display unit is not particularly limited. A user may be notified of the determination result of the reduction processing determination unit as a warning, and selection and display may be performed so a user can approve (establish)/unapprove (unestablish) the determination result of the reduction processing determination unit.

Preferably, the display unit selectably displays establishment of the determination result of the reduction processing determination unit regarding whether the reduction association processing is executed, the image processing device further includes selection unit for accepting user's selection relating to the establishment of the determination result of the reduction processing determination unit, and the reduction processing determination unit establishes whether the reduction association processing is executed in accordance with a selection result accepted through the selection unit.

According to the present aspect, a user can establish and select the determination result (whether the reduction association processing is executed) of the reduction processing determination unit which is displayed by the display unit, and whether the reduction association processing is executed is determined in accordance with the selection result of the user.

Preferably, the processing parameter of the reduction association processing and the processing parameter of the reduction processing which are determined by the reduction processing determination unit include a plurality of selection candidates, the display unit selectably displays the processing parameter of the reduction association processing and the processing parameter of the reduction processing from the plurality of selection candidates, the image processing device further includes selection unit configured to accept user's selection from the plurality of selection candidates, and the reduction processing determination unit establishes the processing parameter of the reduction association processing and the processing parameter of the reduction processing in accordance with a selection result accepted through the selection unit.

According to the present aspect, a user can select the processing parameter of the reduction association processing and the processing parameter of the reduction processing from a plurality of selection candidates displayed by the display unit, and the processing parameter of the reduction association processing and the processing parameter of the reduction processing are determined in accordance with the selection result of the user. Therefore, the range of the selection candidates is made appropriate in accordance with the shooting condition data, and thus the user's selection of an optimum processing parameter is facilitated.

Preferably, the image processing device includes reduction association processing unit configured to perform the reduction association processing in accordance with whether the established reduction association processing is executed and the processing parameter of the reduction association processing.

According to the present aspect, the reduction association processing of the image pickup data can be performed by the reduction association processing unit on the basis of whether the established reduction association processing is executed or the determination result of the processing parameter of the reduction association processing. Therefore, the reduction association processing is not performed when a user determines that the reduction association processing is not required from the shooting condition data, and the reduction association processing based on the processing parameter suitable for the shooting condition data can be performed in accordance with a user's intention.

Preferably, the image processing device includes reduction processing unit to perform the reduction processing in accordance with the processing parameter of the established reduction processing.

According to the present aspect, the reduction processing of the reduction processing unit can be performed on the basis of the processing parameter of the established reduction processing. Therefore, the reduction processing based on the processing parameter suitable for the shooting condition data can be performed in accordance with a user's intention.

According to another aspect of the present invention, there is provided an image pickup device including: an image pickup unit which is provided with an image pickup section that images and creates image capture data including image pickup data; and the aforementioned image processing device.

The image pickup device of the present aspect is not particularly limited, and mobile appliances having functions other than image pickup (call function, communication function, and other computer functions) can also included in the image pickup device as used herein, in addition to a digital camera having a main function of image pickup.

According to another aspect of the present invention, there is provided an image pickup device including: an image pickup unit which is provided with a plurality of image pickup sections including at least a first image pickup section and a second image pickup section; and the aforementioned image processing device.

The image pickup device of the present aspect is not particularly limited, and mobile appliances having functions other than image pickup (call function, communication function, and other computer functions) can also be included in the image pickup device as used herein, in addition to a digital camera (such as, for example, 3D-compatible camera) which includes a plurality of image pickup sections and has a main function of image pickup.

According to another aspect of the present invention, there is provided an image pickup device including: an image pickup unit which is provided with an image pickup section that images and creates image capture data including image pickup data, the image pickup section being capable of selected and replaced from a plurality of image pickup sections including at least a first image pickup section and a second image pickup section; and the aforementioned image processing device.

The image pickup device of the present aspect is not particularly limited. For example, a digital camera or the like having a lens or an image pickup element (such as CCD or CMOS) which is capable of being replaced by a user can be included in the image pickup device as used herein.

According to another aspect of the present invention, there is provided a computer including the aforementioned image processing device.

According to another aspect of the present invention, there is provided an image processing method including: a data acquisition step of discriminating whether shooting condition data is included in image capture data including image pickup data, and acquiring contents of the shooting condition data when it is discriminated that the shooting condition data is included in the image capture data to be input; and a reduction processing determination step of determining at least any of whether reduction association processing associated with reduction processing of generating reduced image data from the image pickup data is executed, a processing parameter of the reduction association processing, and a processing parameter of the reduction processing, on the basis of an acquisition result of the shooting condition data, wherein the shooting condition data includes information on the presence or absence of an optical low-pass filter at the time of the creation of the image pickup data.

According to another aspect of the present invention, there is provided an image processing method including: a data acquisition step of discriminating whether shooting condition data is included in image capture data including image pickup data, and acquiring contents of the shooting condition data when it is discriminated that the shooting condition data is included in the image capture data to be input; and a reduction processing determination step of determining at least any of whether reduction association processing associated with reduction processing of generating reduced image data from the image pickup data is executed, a processing parameter of the reduction association processing, and a processing parameter of the reduction processing, on the basis of an acquisition result of the shooting condition data, wherein the shooting condition data includes information on an array of color filters of an image pickup section used at the time of the creation of the image pickup data.

According to another aspect of the present invention, there is provided a non-transitory computer readable medium storing a program causing a computer to execute: a procedure of discriminating whether shooting condition data is included in image capture data including image pickup data, and acquiring contents of the shooting condition data when it is discriminated that the shooting condition data is included in the image capture data to be input; and a procedure of determining at least any of whether reduction association processing associated with reduction processing of generating reduced image data from the image pickup data is executed, a processing parameter of the reduction association processing, and a processing parameter of the reduction processing, on the basis of an acquisition result of the shooting condition data, wherein the shooting condition data includes information on the presence or absence of an optical low-pass filter at the time of the creation of the image pickup data.

According to another aspect of the present invention, there is provided a program causing a computer to execute: a procedure of discriminating whether shooting condition data is included in image capture data including image pickup data, and acquiring contents of the shooting condition data when it is discriminated that the shooting condition data is included in the image capture data to be input; and a procedure of determining at least any of whether reduction association processing associated with reduction processing of generating reduced image data from the image pickup data is executed, a processing parameter of the reduction association processing, and a processing parameter of the reduction processing, on the basis of an acquisition result of the shooting condition data, wherein the shooting condition data includes information on an array of color filters of an image pickup section used at the time of the creation of the image pickup data.

According to the present invention, it is possible to determine at least any of whether the reduction association processing is executed, the processing parameter of the reduction association processing, and the processing parameter of the reduction processing, on the basis of the information on the presence or absence of the optical low-pass filter at the time of the creation of image pickup data or the information on the array of the color filters of the image pickup section. Therefore, it is possible to optimize the reduction association processing and the reduction processing in accordance with the presence or absence of the optical low-pass filter or the array of the color filters of the image pickup section, and to generate a reduced image in which image degradation such as moire is not conspicuous.

BRIEF DESCRIPTION OF THE DRAWINGS

FIGS. 1A to 1C are functional block diagrams illustrating appliances capable of applying the present invention; FIG. 1A illustrates an example of an image pickup device including one image pickup element, FIG. 1B illustrates an example of an image pickup device including two (a plurality of) image pickup elements, and FIG. 1C illustrates an example in which an image pickup section and an image reduction processing section are separately provided.

FIGS. 2A and 2B are diagrams illustrating an outline of input and output image capture data of the image reduction processing section; FIG. 2A illustrates a data structure before and after processing in the image reduction processing section, and FIG. 2B illustrates an example of supplementary information (shooting condition data).

FIG. 4A illustrates color filters having a Bayer array, and FIG. 4B illustrates color filters having an array of another type.

FIGS. 7A and 7B are flow diagrams illustrating a flow of reduction processing according to a first embodiment; FIG. 7A is a flow diagram relating to processing A (reduction association processing), and FIG. 7B is a flow diagram in which low-pass filter (LPF) processing is adopted as the processing A.

FIG. 8A is a flow diagram relating to the processing A (reduction association processing), and FIG. 8B is a flow diagram in which the low-pass filter (LPF) processing is adopted as the processing A.

FIGS. 9A and 9B are flow diagrams illustrating a flow of reduction processing according to a third embodiment; FIG. 9A is a flow diagram relating to processing B (reduction processing), and FIG. 9B is a flow diagram when reduction processing based on a spline interpolation processing method is adopted as the processing B.

FIG. 10 is a flow diagram illustrating a flow of reduction processing according to a fourth embodiment.

DESCRIPTION OF THE PREFERRED EMBODIMENTS

Hereinafter, embodiments of the present invention will be described with reference to the accompanying drawings. First, the outline of the present invention will be described, and then specific application examples will be described. Meanwhile, the following configurations are merely illustrative, and the present invention can also be applied to other configurations. In addition, each configuration can be appropriately realized by any hardware, software, or a combination of both.

The present invention relates to a reduction processing technique of a captured image, and can be applied to the entire appliances capable of performing image processing of a captured image. Therefore, the present invention can also be realized by, for example, an image pickup device such as a camera capable of capturing an image, or a computer to which the image pickup device is connected.

Figure 1C:
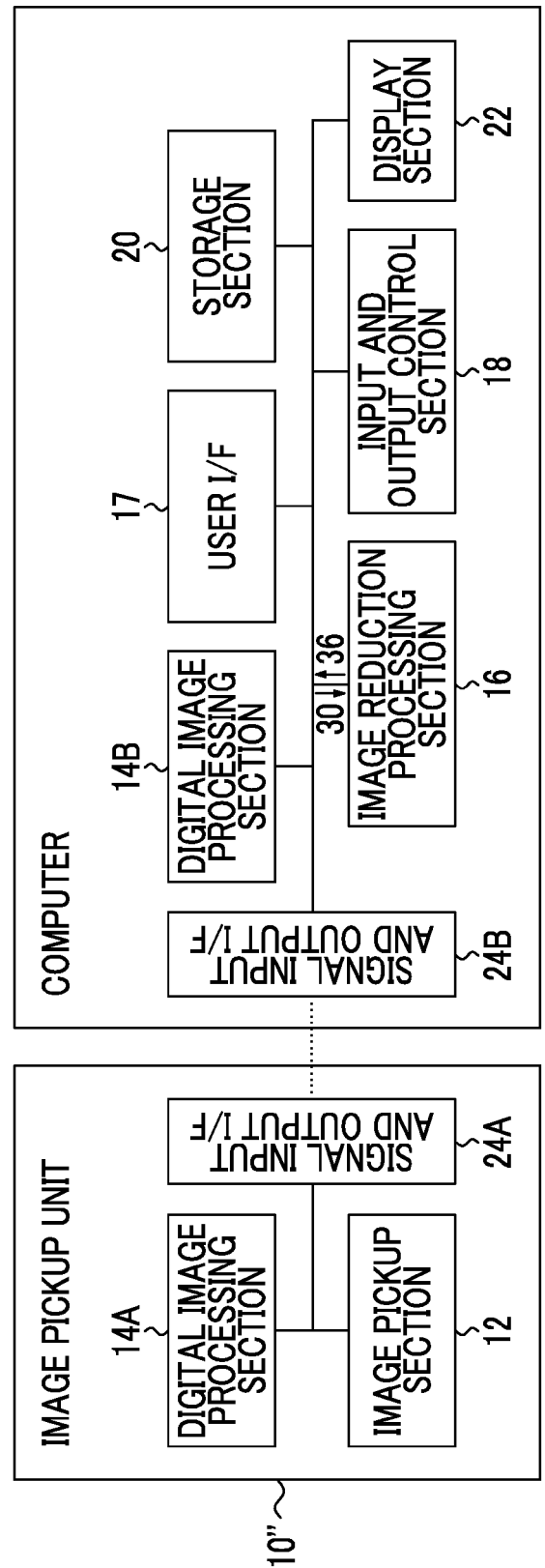

FIG. 1A is a functional block diagram illustrating an example of an image pickup device including one image pickup element, and FIG. 1B is a functional block diagram illustrating an an example of an image pickup device including two (a plurality of) image pickup elements. In addition, FIG. 1C is a functional block diagram illustrating an example of an image pickup device and a computer to which the image pickup device is connected.

An image pickup unit 10 shown in FIG. 1A includes an image pickup section 12, a digital image processing section 14, an image reduction processing section 16, a user I/F (user interface) 17, an input and output control section 18, a storage section 20, a display section 22 and a signal input and output I/F (signal input and output interface) 24 which are connected to each other.

The image pickup section 12 includes, for example, an image pickup element (such as CCD or CMOS) and the like in which a lens, an aperture, a shutter, and color filters are arranged, as necessary, and generates image pickup data by performing image capture. Meanwhile, an optical low-pass filter (OLPF) described later may or may not be provided in the image pickup section 12.

The digital image processing section 14 performs digital image processing on the image pickup data generated by the image pickup section 12, and performs, for example, offset correction processing, WB (white balance) correction processing, overexposure pixel detection correction processing, exposure correction processing, γ (gamma) correction processing, synchronization processing, and the like, as necessary.

Meanwhile, data of shooting conditions (shooting condition data (shooting date, number of pixels, F value (aperture value), and the like) when the image pickup data is acquired by the image pickup section 12 may be added to the image pickup data. The shooting condition data may be added to the image pickup data in the image pickup section 12 at the time of image capture, and may be added to the image pickup data in the digital image processing section 14 or the like after image capture. When the shooting condition data is not added to the image pickup data, image capture data which does not include the shooting condition data but includes the image pickup data is generated. The image capture data generated in this manner is sent to the image reduction processing section 16 located at a subsequent stage.

The image reduction processing section 16 generates a reduced image of a captured image on the basis of the image capture data to be input. Although described later in detail, as shown in FIG. 2A, image capture data 30 including image capture data (main image) 32 and shooting condition data (supplementary information) 34 is configured such that a reduced image is generated in the image reduction processing section 16, and that image capture data 36 further including reduced image data (such as a thumbnail image) 38 is output from the image reduction processing section 16. Particularly, in the following embodiment, when the shooting condition data 34 includes "information on the presence or absence of an optical low-pass filter" and/or "information on the array patterns of color filters", the image reduction processing section 16 performs reduction processing optimized for the "information on the presence or absence of an optical low-pass filter" and/or the "information on the array pattern of color filters", thereby allowing a reduced image having an excellent image quality to be generated.

Meanwhile, the image capture data 30 which is input to the image reduction processing section 16 may not include the shooting condition data (particularly, "information on the presence or absence of an optical low-pass filter" and/or "information on the array pattern of color filters") 34 as shown in FIG. 2B. In this case, the image reduction processing section 16 generates a reduced image by performing reduction processing suitable for the image capture data 32 to which the shooting condition data is not added.

The details of image reduction processing in the image reduction processing section 16 will be described later (see FIGS. 6 to 14).

The output of the image capture data 36 including the "reduced image data 38 generated in the image reduction processing section 16" and the "image capture data (main image) 32 identical with the image capture data 30" is controlled by the input and output control section 18 shown in FIG. 1A, and the image capture data is stored in the storage section (such as a memory) 20, has a reduced image displayed on the display section (such as a liquid crystal display) 22, or is output to the outside through the signal input and output I/F 24.

Meanwhile, various processing information in the image pickup section 12, the digital image processing section 14, the image reduction processing section 16, and the input and output control section 18 can be provided to a user through the display section 22. While a user confirms the information displayed on the display section 22, the user can also send a control instruction signal through the user I/F 17 to the image pickup section 12, the digital image processing section 14, the image reduction processing section 16, and the input and output control section 18.

The generation of the above-mentioned reduced image can be performed similarly in an image pickup unit 10' including a plurality of image pickup sections (first image pickup section 12A and second image pickup section 12B) as shown in FIG. 1B. That is, similarly to the image pickup unit 10 (FIG. 1A) having one image pickup section, the image pickup data generated in each of the first image pickup section 12A and the second image pickup section 12B is subject to digital image processing in the digital image processing section 14, and has a reduced image generated in the image reduction processing section 16. The input and output of the image capture data 36 including the reduced image is controlled by the input and output control section 18, and the image capture data 36 is stored in the storage section 20, has a reduced image displayed on the display section 22, or is output to the outside through the signal input and output I/F 24. Meanwhile, similarly, a user can send a control instruction signal through the user I/F 17 to the image pickup sections (first image pickup section 12A and second image pickup section 12B), to the digital image processing section 14, the image reduction processing section 16, and the input and output control section 18.

Meanwhile, as a configuration in which the image pickup section can be replaced, it is also possible to adopt an image pickup unit capable of being selected and replaced from a plurality of image pickup sections including at least the first image pickup section and the second image pickup section. For example, it is possible to use a configuration capable of attaching and detaching the first image pickup section 12A and the second image pickup section 12B shown in FIG. 1B, and to use a configuration capable of selecting and employing any of the first image pickup section 12A and the second image pickup section 12B. Appliances in which such configurations are adopted include, for example, a camera (such as a lens replaceable camera) capable of replacing the lens unit (image pickup section) including a lens to an image pickup element.

FIGS. 1A and 1B illustrate an example in which the image pickup sections 12, 12A, and 12B and the image reduction processing section 16 are singly provided, but the image pickup section and the image reduction processing section may be separately provided as shown in FIG. 1C.

For example, the present invention can also be applied to a system in which an image pickup unit 10" including the image pickup section 12 and a computer 11 including the image reduction processing section 16 can be connected to each other through mutual signal input and output I/Fs 24A and 24B.

In this case, the digital image processing section may be provided on the image pickup unit 10 side (see sign "14A" of FIG. 1C), and may be provided on the computer 11 side (see sign "14B" of FIG. 1C). When the digital image processing section 14A is provided on the image pickup unit 10" side, the image capture data after digital image processing is output from the image pickup unit 10" through the signal input and output I/F 24A, and is input to the computer 11 through the signal input and output I/F 24B. Similarly to the above, the image capture data 30 which is input to the computer 11 has a reduced image generated in the image reduction processing section 16, and the image capture data 36 including the reduced image is controlled by the input and output control section 18 and is appropriately output to the storage section 20, the display section 22 and the signal input and output I/F 24B. In addition, when the digital image processing section 14B is provided on the computer 11 side, the image capture data 30 including image capture data (such as Raw data) before digital image processing is output from the image pickup unit 10" through the signal input and output I/F 24A, and is input to the computer 11 through the signal input and output I/F 24B. Similarly to the above, the image capture data 30 which is input to the computer 11 is subject to digital image processing in the digital image processing section 14B, and has a reduced image generated in the image reduction processing section 16. The image capture data 36 including the reduced image is controlled by the input and output control section 18, and is appropriately output to the storage section 20, the display section 22 and the signal input and output I/F 24B.

Meanwhile, such a functional configuration can be applied to not only the "image pickup device (system) which is provided with the image pickup unit having the image pickup section 12 that images and creates the image capture data 30 including the image capture data 32, and the computer having the image reduction processing section (image processing device) 16" shown in FIG. 1C, but also the "image pickup device (system) which is provided with the image pickup unit having a plurality of image pickup sections including at least the first image pickup section 12A and the second image pickup section 12B, and the computer having the image reduction processing section (image processing device) 16" as in a case where the image pickup unit 10' shown in FIG. 1B is connected to the computer 11.

Next, a more detailed specific example will be described in which the image pickup unit 10 of the above-mentioned type shown in FIG. 1A is applied to a digital camera.

Figure 3:
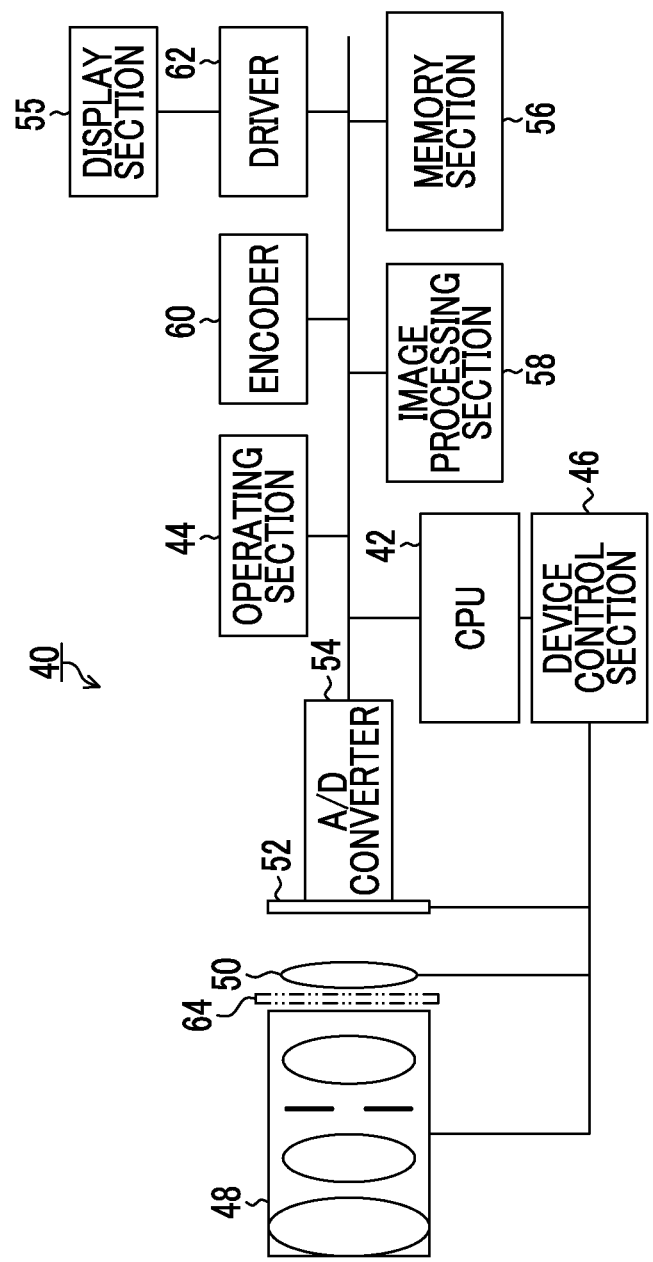
FIG. 3 is a block diagram illustrating an embodiment of an image pickup device (digital camera).

FIG. 3 is a block diagram illustrating an embodiment of an image pickup device (digital camera).

An image pickup device 40 is a digital camera that records a captured image in an internal memory (memory section 56) or an external recording media (not shown), and the operation of the entire device is collectively controlled by a CPU (central processing section) 42.

The image pickup device 40 is provided with an operating section 44 including a shutter button (shutter switch), a mode dial, a playback button, a MENU/OK key, a cross key, a zoom button, a BACK key, and the like. A signal from the operating section 44 is input to the CPU 42. The CPU 42 controls each circuit of the image pickup device 40 on the basis of the input signal, controls a lens section 48, a shutter 50, and an image pickup element 52 functioning as image acquisition unit, for example, through a device control section 46, and performs shooting operation control, image processing control, recording/reproduction control of image data, display control of a display section 55, and the like.

The lens section 48 includes a focus lens, a zoom lens, an aperture, and the like, and the flux of light passing through the lens section 48 and the shutter 50 is formed on the light receiving surface of the image pickup element 52.

The image pickup element 52 is a color image sensor of a CMOS (Complementary Metal-Oxide Semiconductor) type, an XY address type, a CCD (Charge Coupled Device) type, or the like, and has a structure in which color filters and a large number of light receiving elements (photodiodes) that receive light passing through the color filters are arrayed two-dimensionally. A subject image formed on the light receiving surface of each photodiode is converted into a signal voltage (or charge) having an amount depending on incident light intensity.

Figure 4A:
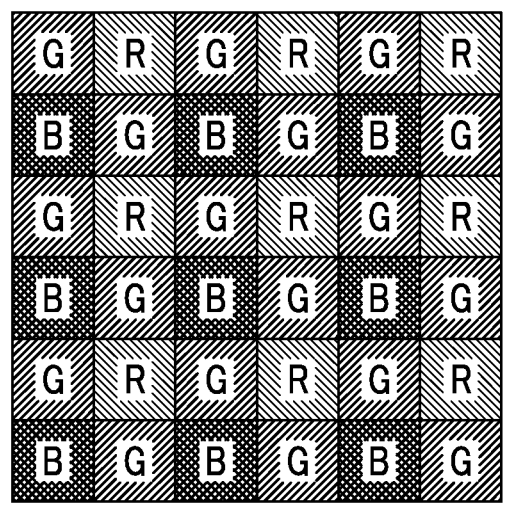
FIGS. 4A and 4B are diagrams illustrating a basic array pattern example of color filters.
Figure 4B:
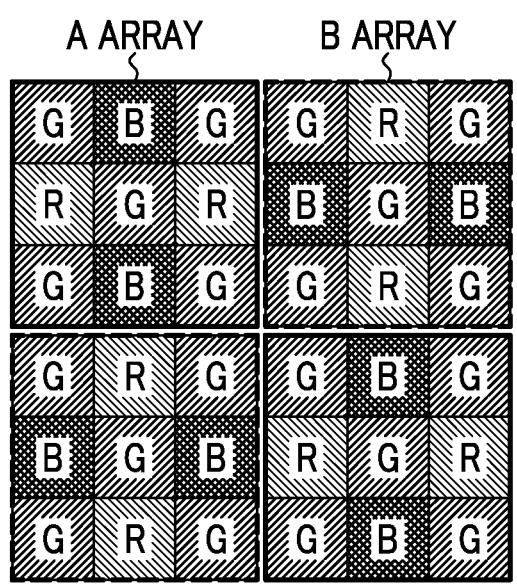

FIGS. 4A and 4B are diagrams illustrating a basic array pattern example of color filters. FIG. 4A illustrates color filters having a so-called Bayer array, and FIG. 4B illustrates color filters having another type of array. Meanwhile, in FIGS. 4A and 4B, "R" represents a red filter, "G" represents a green filter, and "B" represents a blue filter.

The color filters of the image pickup element 52 in the present example are configured such that a basic array pattern P composed of square array patterns corresponding to M×N (6×6) pixels is repeatedly arranged in horizontal direction and perpendicular directions. Therefore, when image processing or the like of RAW data (mosaic image) of RGB read out from the image pickup element 52 is performed, it is possible to perform processing in accordance with a repetitive pattern. In such a color filter array, filters (R filter, G filter, and B filter) of respective colors of red (R), green (G), and blue (B) are arrayed with a predetermined periodicity.

For example, in the color filters having a Bayer array shown in FIG. 4A, a row (row in a horizontal direction) in which the G filter and the R filter are alternately arranged and a row in which the G filter and the R filter are alternately arranged are alternately arranged with respect to a perpendicular direction, and the G filter is arranged at positions of the top, bottom, left and right of each R filter and each B filters. The B filter is arranged at a position of each R filter in an oblique direction, the R filter is arranged at a position of each B filter in an oblique direction, and the G filter is arranged at a position of each G filter in an oblique direction.

On the other hand, in the color filters having another array shown in FIG. 4B, array A of 3×3 pixels surrounded by a solid-line frame and array B of 3×3 pixels surrounded by a broken-line frame are alternately lined up in horizontal direction and perpendicular directions.

In each of array A and array B, the G filter is arranged at four corners and the center, and the G filter is arranged on both diagonals. In array A, the R filters are arrayed in a horizontal direction with the central G filter interposed therebetween, and the B filters are arrayed in a perpendicular direction with the central G filter interposed therebetween. On the other hand, in array B, the B filters are arrayed in a horizontal direction with the central G filter interposed therebetween, and the R filters are arrayed in a perpendicular direction with the central G filter interposed therebetween. That is, in array A and array B, a positional relationship between the R filter and the B filter is reversed, but the other arrangements are the same as each other.

In addition, the G filters of four corners in array A and array B become G filters having a square array corresponding to 2×2 pixels by array A and array B being alternately arranged in horizontal and perpendicular directions.

Figure 5:
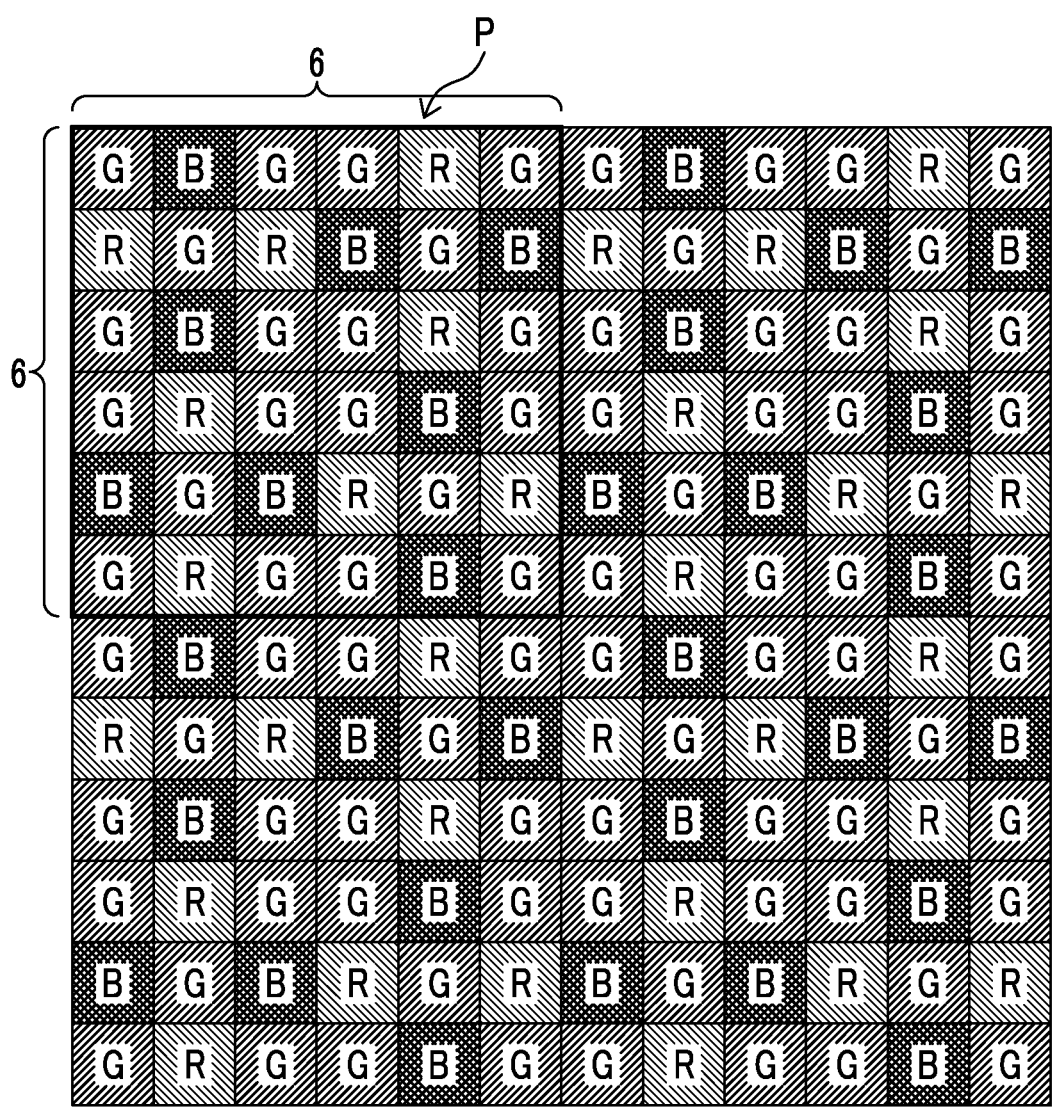
FIG. 5 illustrates a color filter array in with two color filters having a basic array pattern shown in FIG. 4B are arranged side by side in horizontal direction and perpendicular directions.

FIG. 5 illustrates a color filter array in with two color filters having a basic array pattern shown in FIG. 4B are arranged side by side in horizontal direction and perpendicular directions. In this color filter array, as obvious from FIG. 5, one or more G filters corresponding to a color (G color in this embodiment) which most contribute to generally obtain a luminance signal are arranged within each line of the color filter array in horizontal, perpendicular, oblique right upper (NE), and oblique left upper (NW) directions.

NE means an oblique right upper direction, and NW means an oblique right lower direction. For example, in an array of square pixels, oblique right upper and oblique right lower directions become directions of 45° with respect to a horizontal direction. However, in an arrays of rectangular pixels, the directions are rectangular diagonal directions and the angle thereof may change depending on the lengths of the long side and the short side.

According to such a color filter array, since the G filter corresponding to a luminance-based pixel is arranged within each line of the color filter array in horizontal, perpendicular, and oblique (NE, NW) directions, it is possible to improve the reproduction accuracy of synchronization processing in a high-frequency region regardless of a high-frequency direction.

In addition, in the color filter array shown in FIG. 5, one or more R filters and one or more B filters corresponding to two or more different colors (R and B colors in this embodiment) other than the above G color are arranged within each line of the basic array pattern in horizontal, and perpendicular directions.

Since the R filter and the B filter are arranged within each line of the color filter array in horizontal and perpendicular directions, it is possible to reduce the generation of a false color (color moire). Thereby, it is possible to omit an optical low-pass filter for reducing (suppressing) the generation of a false color. Meanwhile, even when the optical low-pass filter is applied, it is possible to apply a filter having a weak function of cutting a high frequency component for preventing a false color from being generated, and not to damage a resolution.

Further, in the basic array pattern P of the color filter array shown in FIG. 5, the numbers of R pixels, G pixels, and B pixels corresponding to the R, G, and B filters within the basic array pattern are 8, 20, and 8, respectively. That is, the ratio of the respective numbers of RGB pixels is 2:5:2, the ratio of the number of G pixels which most contribute to obtain a luminance signal is larger than the ratio of the numbers of R pixels and B pixels of different colors.

As described above, in the color filter array shown in FIG. 5, the ratios of the number of G pixels and the numbers of R and B pixels are different from each other. Particularly, since the ratio of the number of G pixels which most contribute to obtain a luminance signal is made larger than the ratios of the number of R and B pixels, it is possible to suppress aliasing at the time of synchronization processing, and to improve high frequency reproducibility.

Signal charge stored in the image pickup element 52 provided with the color filters having a basic array shown in FIGS. 4A and 4B mentioned above is read out as a voltage signal according to signal charge on the basis of a read-out signal which is added from the device control section 46. The voltage signal which is read out from the image pickup element 52 is added to an A/D converter (analog/digital converter) 54, is sequentially converted into digital R, and B signals corresponding to the color filter array, and is temporarily stored in the memory section 56.

The memory section 56 includes a SDRAM which is a volatile memory, an EEPROM (storage unit) which is a rewritable non-volatile memory, and the like. The SDRAM is used as a work area when a program is executed by the CPU 42, and as a storage area that temporarily holds an imaged and acquired digital image signal. On the other hand, camera control programs including an image processing program, defect information of pixels of the image pickup element 52, various parameters and tables which are used for image processing or the like including color mixture correction, and the like are stored in the EEPROM.

The image processing section 58 performs predetermined signal processing such as color mixture correction, white balance correction, gamma correction processing, synchronization processing (demosaic processing), and RGB/YC conversion, on the digital image signal temporarily stored in the memory section 56.

The image data processed by the image processing section 58 is encoded into data for image display in an encoder 60, and is output to the display section 55 provided on the camera back surface through a driver 62. Thereby, a subject image is continuously displayed on the display screen of the display section 55.

When the shutter button of the operating section 44 is held down (half pressed) in a first stage, the CPU 42 starts an AF operation (automatic focus) and an AE operation (automatic exposure), moves the focus lens of lens section 48 in an optical axis direction through the device control section 46, and performs control so that the focus lens comes to a focusing position.

The CPU 42 calculates the brightness (shooting EV value) of a subject on the basis of the image data which is output from the A/D converter 54 when the shutter button is half pressed, and determines exposure conditions (F value and shutter speed) on the basis of the shooting EV value.

When the AE operation and the AF operation are terminated and the shutter button is held down (fully pressed) in a second stage, the aperture, the shutter 50, and the charge storage time of the image pickup element 52 are controlled on the basis of the determined exposure conditions, and main image capture is performed. The image data of mosaic image (image corresponding to the color filter array shown in FIGS. 4A to 5) of RGB which is read out from the image pickup element 52 at the time of the main image capture and is VD-converted by the A/D converter 54 is temporarily stored in the memory section 56.

The image data which is temporarily stored in the memory section 56 is appropriately read out by the image processing section 58, and predetermined signal processing including color mixture correction, white balance correction, gamma correction, synchronization processing, RGB/YC conversion, and the like are performed on the image data. The image data (YC data) on which the RGB/YC conversion is performed is compressed according to a predetermined compression format (for example, JPEG format), and the compressed image data is recorded in an internal memory or an external memory in a predetermined image file (for example, Exif file) type.

In such an image pickup device 40, an optical low-pass filter (OLPF) 64 that optically cuts a high frequency component of light with which the image pickup element 52 is irradiated may be arranged. For example, when the color filters having the basic array of a Bayer type shown in FIG. 4A are used, the high frequency component of an obtained image has a tendency to serve as a factor for image degradation such as moire. Therefore, when image data is acquired using the color filters such as a Bayer type in which the high frequency component has a tendency for image degradation, the image degradation can be suppressed by arranging the optical low-pass filter 64. On the other hand, when the color filters having the basic array shown in FIG. 4B are used, the image degradation such as moire can be further reduced as described above, the optical low-pass filter is not provided, thereby allowing high-resolution image data having a high frequency component left behind to be obtained.

In this manner, whether the optical low-pass filter 64 is arranged is appropriately determined depending on the configuration of a device such as the type of an image pickup element (color filter) used in the image pickup device 40 and specific image processing contents.

Next, specific processing contents associated with image reduction processing in the image pickup device 40 having such a device configuration will be described.

As described with reference to FIG. 2A, in the image reduction processing, the image capture data 30 which does not include reduced image data is input to the image reduction processing section 16, the reduced image data 38 is generated in the image reduction processing section 16, and the shooting condition data 34 including the reduced image data 38 is output from the image reduction processing section 16.

Figure 6:
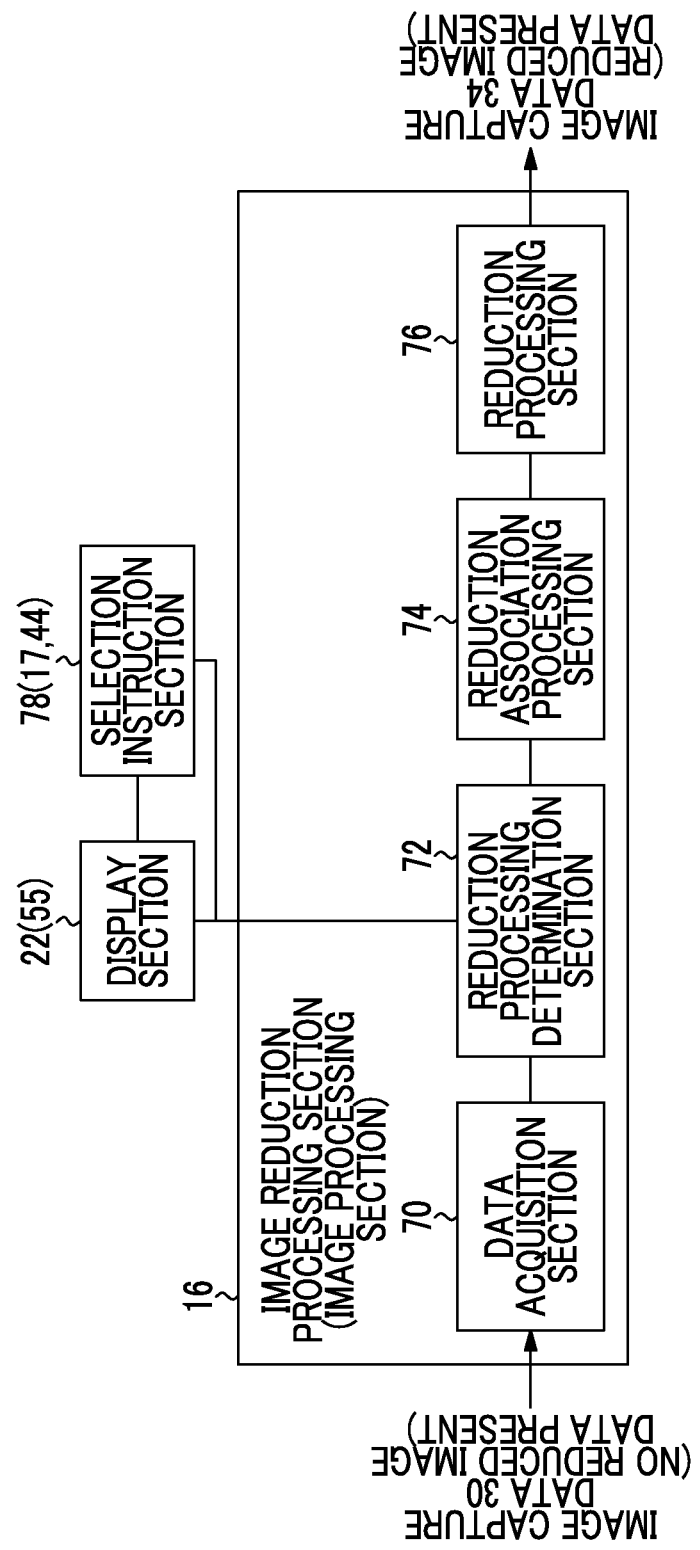
FIG. 6 is a functional block diagram which is associated with image reduction processing based on the image reduction processing section.

FIG. 6 is a functional block diagram which is associated with image reduction processing based on the image reduction processing section 16. The image reduction processing section 16 includes a data acquisition section (data acquisition unit) 70, a reduction processing determination section (reduction processing determination unit) 72, a reduction association processing section (reduction processing association processing unit) 74, and a reduction processing section (reduction processing unit) 76.

The data acquisition section 70 acquires whether the shooting condition data 34 is included in the image capture data 30 (see FIGS. 2A and 2B) to be input, and the content of the shooting condition data 34. The whole data relating to information which can influence the reduced image data generated in a subsequent stage can be included in the shooting condition data 34 acquired by the data acquisition section 70. Particularly, in the present example, "information on the presence or absence of the optical low-pass filter 64 (see FIG. 3) at the time of the creation of the image capture data 32", which is some determination standard, and the presence or absence of the high frequency component serving as a factor for image degradation such as moire in the reduced image, "information on the array (see FIGS. 4A to 5) of the color filters of the image pickup element used at the time of the creation of image pickup data", and the like can be included in the shooting condition data 34.

The reduction processing determination section 72 determines at least any of whether the reduction association processing associated with the reduction processing of the image capture data 30 is executed, a processing parameter of the reduction association processing, and a processing parameter of the reduction processing, on the basis of the acquisition result of the shooting condition data 34 in the data acquisition section 70.

The term "reduction association processing" as used herein refers to processing which may include the whole processing associated with image reduction processing at a subsequent stage, and includes, for example, reduction preprocessing of performing processing of the image capture data 30 in advance of the image reduction processing. The reduction preprocessing includes, for example, processing for preventing image degradation such as moire in the reduced image. Specifically, processing of removing a high frequency component from the image capture data 30 through a low-pass filter (LPF) or the like can be used as the reduction association processing. Therefore, when the reduction association processing is low-pass filter processing, the reduction processing determination section 72 determines whether the low-pass filter processing is executed and/or the processing parameter of the low-pass filter processing, on the basis of the acquisition result of the shooting condition data 34 in the data acquisition section 70.

Meanwhile, in the determination in such a reduction processing determination section 72, processing may be progressed through interaction which urges a user to make selection and determination (establishment), and processing may be progressed without urging a user to make selection and determination, on the basis of the determination result in the data acquisition section 70. In a case of interaction with a user, for example, the reduction processing determination section 72 can selectably display the determination result on the display section 22. In this case, a user can select whether the determination result of the reduction processing determination section 72 which is displayed on the display section 22 is established, through the selection instruction section 78.

Meanwhile, the selection instruction section 78 can have any configuration, and may be provided integrally with the display section 22 and may be provided separately from the display section 22. The selection instruction section 78 and the display section 22 are integrally provided as in a touch panel or the like, thereby allowing a user to intuitively perform selection and determination or establishment and selection which are presented to the display section 22. In addition, when the selection instruction section 78 is constituted by a button or the like which is provided separately from the display section 22, a user can perform selection and determination or establishment and selection by the selection instruction section 78 associating a display of a cursor or the like displayed on the display section 22 with a desired selection candidate.

The reduction processing determination section 72 establishes whether the reduction association processing is executed, the processing parameter of the reduction association processing, and the processing parameter of the reduction processing, in accordance with the selection result of a user relating to the establishment of the determination result. Therefore, when the determination result in the reduction processing determination section 72 such as, for example, the "execution of the reduction association processing" is displayed on the display section 22, the reduction association processing is executed at a subsequent stage in a case where a user performs the selection of establishing the "execution of the reduction association processing", but the reduction association processing is not executed at a subsequent stage in a case where a user does not perform the selection of establishing the "execution of the reduction association processing" (a case where the selection of rejecting the "execution of the reduction association processing" is performed, and a case where the "non-execution of the reduction association processing" is selected).

In addition, the processing parameter of the reduction association processing and the processing parameter of the reduction processing which are determined by the reduction processing determination section 72 may include a plurality of selection candidates. In this case, the display section 22 can display the processing parameter of the reduction processing so as to be selectable from the plurality of selection candidates. A user can select a candidate adopted as the processing parameter from the plurality of selection candidates displayed on the display section 22, and the reduction processing determination section 72 can establish the processing parameter of the reduction association processing and the processing parameter of the reduction processing, in response to the user's selection.

When whether the reduction association processing is executed, the processing parameter of the reduction association processing, and the processing parameter of the reduction processing are determined in the reduction processing determination section 72, the reduction association processing section 74 and the reduction processing section 76 perform the reduction association processing and the reduction processing on the basis of the determination (establishment) in the reduction processing determination section 72.

The reduction association processing section 74 performs the reduction association processing of the image capture data 32 in accordance with the determination result of the reduction processing determination section 72. Particularly, when whether the reduction association processing is executed and the processing parameter of the reduction association processing are selected and established by a user through the display section 22 and the selection instruction section 78, the reduction association processing section 74 performs the reduction association processing of the image capture data 32 in accordance with whether the reduction association processing is executed and the processing parameter of the reduction association processing which are established.

Meanwhile, the reduction association processing may not be necessarily executed. For example, when the "non-execution of the reduction association processing" is determined in the reduction processing determination section 72, the reduction association processing in the reduction association processing section 74 is skipped, and the reduction processing in the subsequent-stage reduction processing section 76 is performed. In addition, the reduction association processing section 74 may not be provided. In this case, the determination of whether the reduction association processing is executed or the processing parameter of the reduction association processing is not performed in the reduction processing determination section 72.

The reduction processing section 76 performs the reduction processing of the image capture data 32 in accordance with the determination result of the reduction processing determination section 72. When the processing parameter of the reduction processing is selected and established by a user through the display section 22 and the selection instruction section 78, the reduction processing section 76 performs the reduction processing of the image capture data 32 in accordance with the established processing parameter of the reduction processing.

In this manner, the reduction processing is performed by the processing parameter determined on the basis of the shooting condition data 34, and thus it is possible to make appropriate the quality of the reduced image obtained by the reduction processing, and to further prevent image degradation such as moire from occurring. Particularly, when the reduction association processing such as the low-pass filter processing is performed in advance of the image reduction processing in the reduction processing section 76 in accordance with the processing parameter based on the shooting condition data 34, it is possible to further prevent image degradation such as moire.

Meanwhile, in the above-mentioned image pickup device 40 (see FIG. 3), the lens section 48, the optical low-pass filter 64, the shutter 50, and the image pickup element 52 function as the image pickup sections 12, 12A, and 12B of FIG. 1, the image processing section 58 functions as the digital image processing sections 14, 14A, and 14B and the image reduction processing section 16 of FIG. 1, the operating section 44 functions as the user I/F 17 of FIG. 1, the CPU 42 functions as the input and output control section 18 of FIG. 1, the encoder 60 and the driver 62 function as the input and output control section 18 of FIG. 1, the memory section 56 functions as the storage section 20 of FIG. 1, and the display section 55 functions as the display section 22 of FIG. 1. In addition, the selection instruction section (selection unit) 78 of FIG. 6 corresponds to the user I/F 17 of FIGS. 1A to 1C and the operating section 44 of FIG. 3.

Next, specific reduction processing examples will be described.

First Embodiment

Figure 7A:
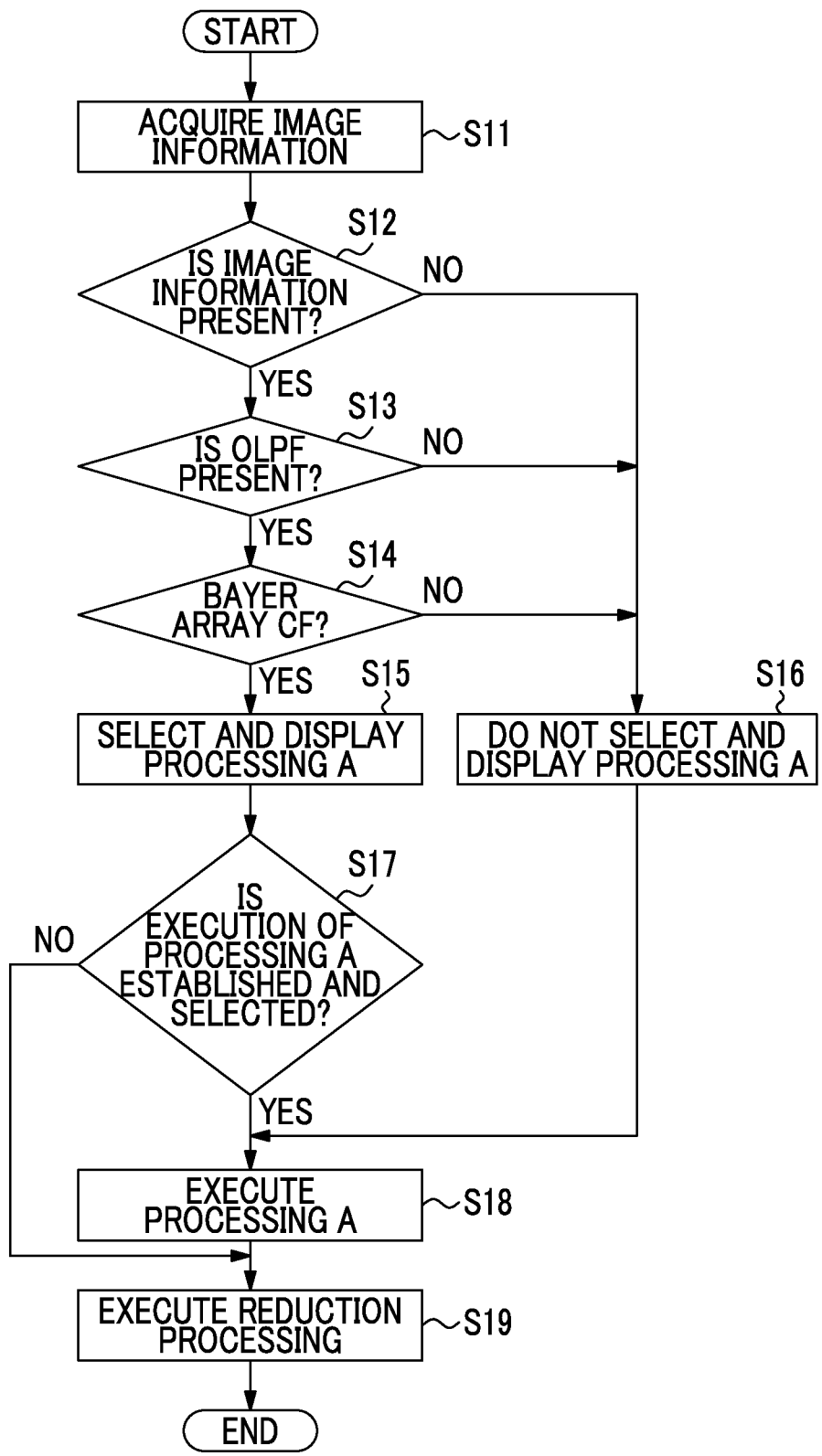

A reduction processing example according to a first embodiment will be described with reference to FIGS. 6 to 7B. FIG. 7A is a flow diagram illustrating a flow of reduction processing according to the first embodiment.

The present embodiment can be applied when the image reduction processing is performed in, for example, a computer to which an image pickup unit is connected (see FIG. 1C), and it is assumed that a program (software) for causing the computer to execute the following series of reduction processing (including the reduction association processing) is installed, and the like.

In the present embodiment, the presence or absence of selection and display relating to the execution of the reduction association processing (processing A, low-pass filter processing) is controlled by the presence or absence of shooting condition data, the presence or absence of an optical low-pass filter, and a color filter array.

That is, when the image capture data (no reduced image data present) 30 is input to the image reduction processing section 16, the shooting condition data 34 is acquired in the data acquisition section 70 (step S11 of FIG. 7A). The data acquisition section 70 acquires whether the shooting condition data 34 is included in the image capture data 30, and the content of the shooting condition data 34 (data acquisition step). In the present embodiment, "information on the presence or absence of an optical low-pass filter" and "array information of a color filter" are used as the shooting condition data.

The reduction processing determination section 72 determines at least any of whether the reduction association processing associated with the reduction processing of the image pickup data is executed, the processing parameter of the reduction association processing, and the processing parameter of the reduction processing, on the basis of the acquisition result of the shooting condition data in the data acquisition section 70 (reduction processing determination step).

In the discrimination of whether the shooting condition data 34 is included in the image capture data 30 (S12), when it is discriminated that the shooting condition data 34 is not included in the image capture data 30 (NO in S12), the reduction processing determination section 72 does not select and display the processing A (reduction association processing) on the display section 22 (S16).

On the other hand, when it is discriminated that the shooting condition data 34 is included in the image capture data 30 (YES in S12), the reduction processing determination section 72 discriminates the presence or absence of the optical low-pass filter (OLPF) 64 (see FIG. 3) (S13). When it is discriminated that the optical low-pass filter 64 is not used (NO in S13), the reduction processing determination section 72 does not select and display the processing A on the display section 22 (S16).

On the other hand, when it is discriminated that the optical low-pass filter 64 is present (YES in S13), the reduction processing determination section 72 discriminates whether used color filters (CF) have a Bayer array (S14). When it is discriminated that the color filters do not have a Bayer array (NO in S14), the reduction processing determination section 72 does not select and display the processing A on the display section 22 (S16).

On the other hand, when it is discriminated that the color filters have a Bayer array (YES in S14), the reduction processing determination section 72 selects and displays the processing A on the display section 22 (S15). A user can establish and select the execution of the processing A by operating the selection instruction section 78 on the basis of the selection and display of the processing A on the display section 22.

Meanwhile, a method of performing selection and display on the display section 22 is not particularly limited. For example, the method may be a method of notifying a user as a warning, may be a method of displaying the determination result of the reduction processing determination section 72 and inquiring of a user whether to approve the determination result, and may a method of displaying the determination result of the reduction processing determination section 72 and an option opposite to the determination result causing a user to select either of them.

The reduction processing determination section 72 determines whether the execution of the processing A is selected and established by a user (S17). When it is determined that the execution of the processing A is selected established by a user (YES in S17), the processing A is executed in the reduction association processing section 74 (S18), and then the image reduction processing is performed in the reduction processing section 76 (S19).

On the other hand, when the execution of the processing A is not selected by a user (when the non-execution of the processing A is selected and established) (NO in S17), the processing A is skipped, and the image reduction processing is performed in the reduction processing section 76 in a state where the processing A is not performed (S19).

In addition, as in the case where it is discriminated that the shooting condition data 34 is not present (NO in S12), the case where it is discriminated that the optical low-pass filter is not present (NO in S13), and the case where it is discriminated that the color filters do not have a Bayer array (NO in S14), when the processing A is not selected and displayed on the display section 22 (S16), the selection and establishment of the processing A by a user is not performed, and the processing A is forcibly executed in the reduction association processing section 74 (S18).

FIG. 7B is a flow diagram when the low-pass filter (LPF) processing is adopted as the processing A (reduction association processing) in the processing flow of FIG. 7A. Steps S111 to S119 of FIG. 7B are the same as steps S11 to S19 of FIG. 7A, except that the "processing A" is replaced by the "low-pass filter processing", and thus the detailed description of the process flow shown in FIG. 7B will not be given.

According to the process flows shown in FIGS. 7A and 7B, when the shooting condition data 34 is unclear (NO in S12 and S112), when there is the high probability of the image capture data 32 including many high frequency components due to image capture in a state where the optical low-pass filter is not present (NO in S13 and S113), or when the array of the color filters is a special array other than a Bayer array (NO in S14 and S114), the reduction association processing (processing A, low-pass filter processing) is forcibly executed (S18 and S118) before the reduction processing (S19), without being displayed to a user (S16 and S116).

Therefore, even when the color filters (see, for example, FIGS. 4B and 5) having a basic array other than a Bayer array capable of acquiring the image capture data 32 including many high frequency components are used, the reduction association processing (processing A, low-pass filter processing) is performed before the image reduction processing, and thus it is possible to further reduce image degradation such as moire in the reduced image.

On the other hand, when there is the high probability of high frequency components not being included (or, high frequency components included in the image capture data 32 being very small) due to the image capture and generation of the image capture data 32 in a state where the optical low-pass filter is present (YES in S13 and S113), and the array of the color filters is a general Bayer array (YES in S14 and S114), whether the reduction association processing (processing A, low-pass filter processing) is executed is inquired of a user through the display section 22, and the reduction association processing is executed (YES in S17 and S117) or is not executed (NO in S17 and S117) in accordance with the selection and establishment result through the selection instruction section 78 of a user.

As described above, according to the present embodiment, a settable range and/or processing selection content of the display section 22 and the selection instruction section 78 can be optimized in accordance with the presence or absence of the optical low-pass filter and the array pattern of the color filters, and a user can arbitrarily select optimum processing regarding the generation of the reduced image data 38 based on the image capture data 32. Therefore, the avoidance of image degradation such as moire in the reduced image and the flexible reduction association processing and reduction processing according to user's needs can be realized at a very high level.

Meanwhile, in the above-mentioned embodiment, an example has been described in which both the discrimination (S13 and S113) of the presence or absence of the optical low-pass filter and the discrimination (S14 and S114) of the array pattern of the color filters are performed, but only any one of the discriminations may be performed. For example, when only the presence or absence of the optical low-pass filter is discriminated, the "discrimination of whether the used color filters (CF) have a Bayer array (S14 and S114)" is not performed. Therefore, when it is discriminated that the optical low-pass filter is used, the reduction processing determination section 72 selects and displays the processing A/the low-pass filter processing on the display section 22 (S15 and S115). On the other hand, when only the array pattern of the color filters is discriminated, the "discrimination of the presence or absence of the optical low-pass filter (S13 and S113)" is not performed. Therefore, when it is discriminated that the shooting condition data 34 is included in the image capture data 30 (YES in S12), the reduction processing determination section 72 discriminates whether the used color filters (CF) have a Bayer array (S14 and S114).

In addition, in the above-mentioned embodiment, as in the case where it is discriminated that the shooting condition data 34 is not present (NO in S12), the case where it is discriminated that the optical low-pass filter is not present (NO in S13), and the case where it is discriminated that the color filters do not have a Bayer array (NO in S14), when the processing A is not selected and displayed on the display section 22 (S16), an example has been described in which the reduction association processing (processing A, low-pass filter processing) is forcibly executed in the reduction association processing section 74 (S18). However, in such a case, the reduction association processing may not be forcibly executed.

Second Embodiment

Figure 8A:
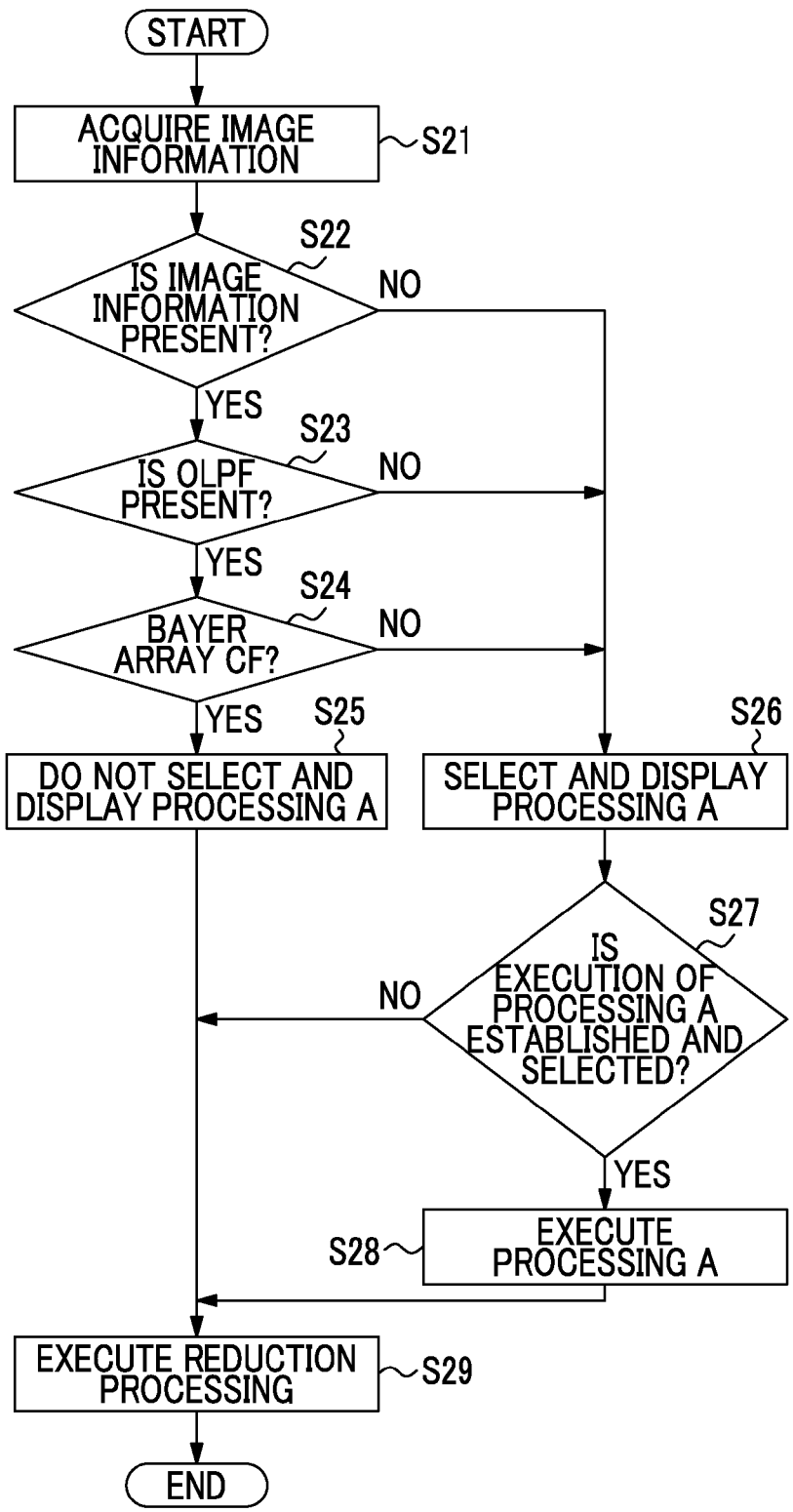
FIGS. 8A and 8B are flow diagrams illustrating a flow of reduction processing according to a second embodiment.

A reduction processing example according to a second embodiment will be described with reference to FIGS. 6, 8A, and 8B. FIG. 8A is a flow diagram illustrating a flow of reduction processing according to the second embodiment.

In the present embodiment, the detailed description of processes which are the same as or similar to those in the first embodiment mentioned above will not be given.

In the present embodiment, the presence or absence of selection and display relating to the execution of the reduction association processing (processing A, low-pass filter processing) is also controlled by the presence or absence of shooting condition data, the presence or absence of an optical low-pass filter, and a color filter array.

That is, as is the case with the first embodiment, when the image capture data (no reduced image data present) 30 is input to the image reduction processing section 16, the shooting condition data 34 is acquired in the data acquisition section 70 (step S21 of FIG. 8A). In addition, the present embodiment is the same as the first embodiment (see S12 to S14 of FIG. 7A), in that the discrimination of whether the shooting condition data is included in the image capture data 30 in the reduction processing determination section 72 is performed (S22), the discrimination of the presence or absence of the optical low-pass filter (OLPF) 64 is performed (S23), and the discrimination of whether the used color filters (CF) have a Bayer array is performed (S24).

However, in the present embodiment, when the shooting condition data 34 is included in the image capture data 30 (YES in S22), the optical low-pass filter 64 is used (YES in S23), and it is discriminated that the used color filters have a Bayer array (YES in S24), the reduction processing determination section 72 does not select and display the processing A on the display section 22 (S25), the processing A is forcibly skipped, and the image reduction processing is performed in the reduction processing section 76 in a state where the processing A is not performed (S29).

On the other hand, when the shooting condition data is not included in the image capture data 30 (NO in S22), the optical low-pass filter 64 is not used (NO in S23), or it is not discriminated that the used color filters do not have a Bayer array (NO in S24), the reduction processing determination section 72 selects and displays the processing A on the display section 22 (S26). A user can establish and select the execution of the processing A by operating the selection instruction section 78 on the basis of the selection and display of the processing A on the display section 22.

The reduction processing determination section 72 determines whether the execution of the processing A is selected and established by a user (S27). When it is determined that the execution of the processing A is selected established by a user (YES in S27), the processing A is executed in the reduction association processing section 74 (S28), and then the image reduction processing is performed in the reduction processing section 76 (S29).

On the other hand, when the execution of the processing A is not selected by a user (when the non-execution of the processing A is selected and established) (NO in S27), the processing A is skipped, and the image reduction processing is performed in the reduction processing section 76 in a state where the processing A is not performed (S29).

Figure 8B:
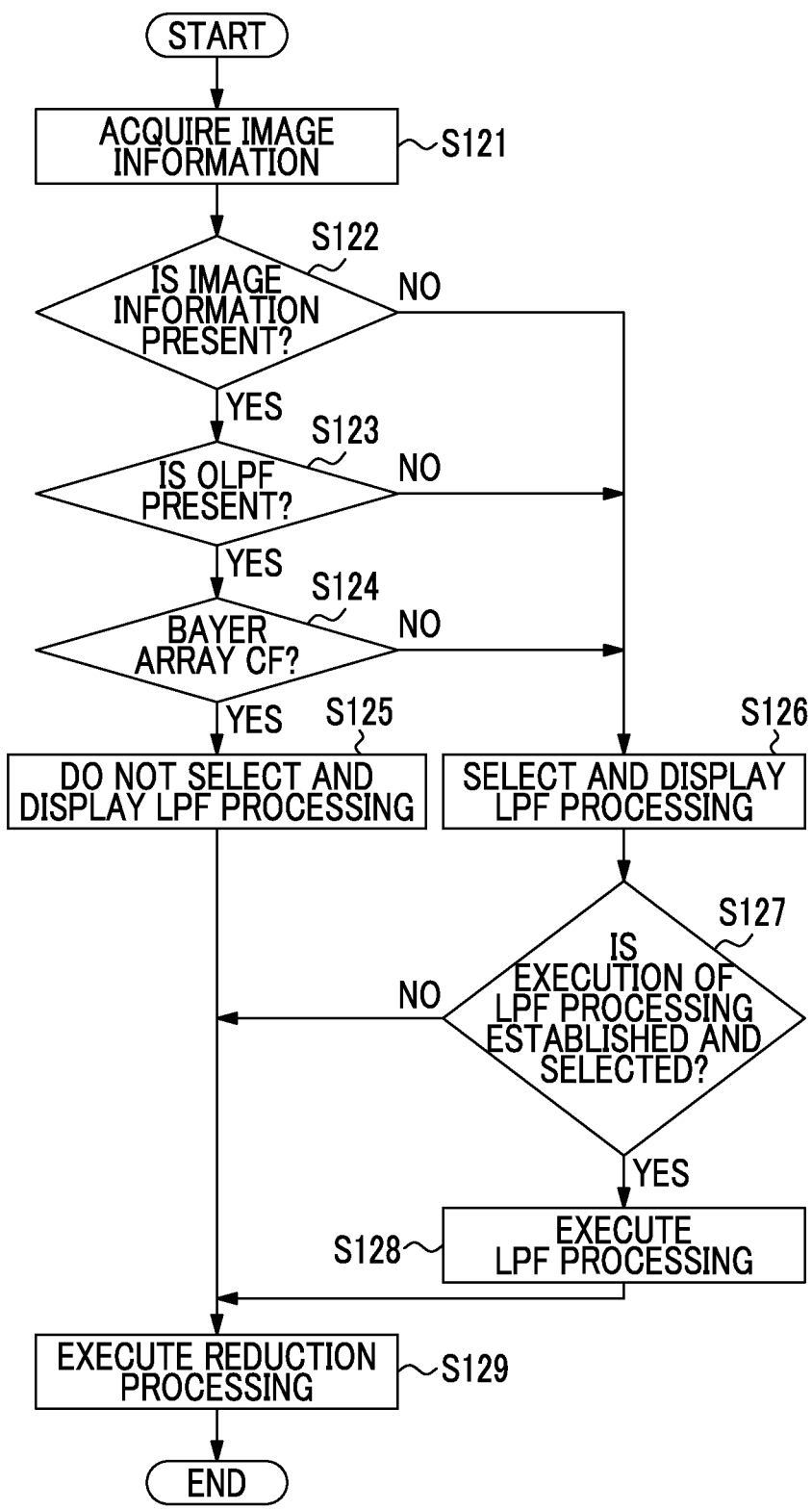

FIG. 8B is a flow diagram when the low-pass filter processing is adopted as the processing A (reduction association processing) in the processing flow of FIG. 8A. Step S121 to S129 of FIG. 8B are the same as steps S21 to S29 of FIG. 8A, except that the "processing A" is replaced by the "low-pass filter processing", and thus the detailed description of the process flow shown in FIG. 8B will not be given.

In this manner, in the present embodiment, the avoidance of image degradation such as moire in the reduced image and the flexible reduction association processing and reduction processing according to user's needs can also be realized at a very high level.

Third Embodiment

Figure 9B:
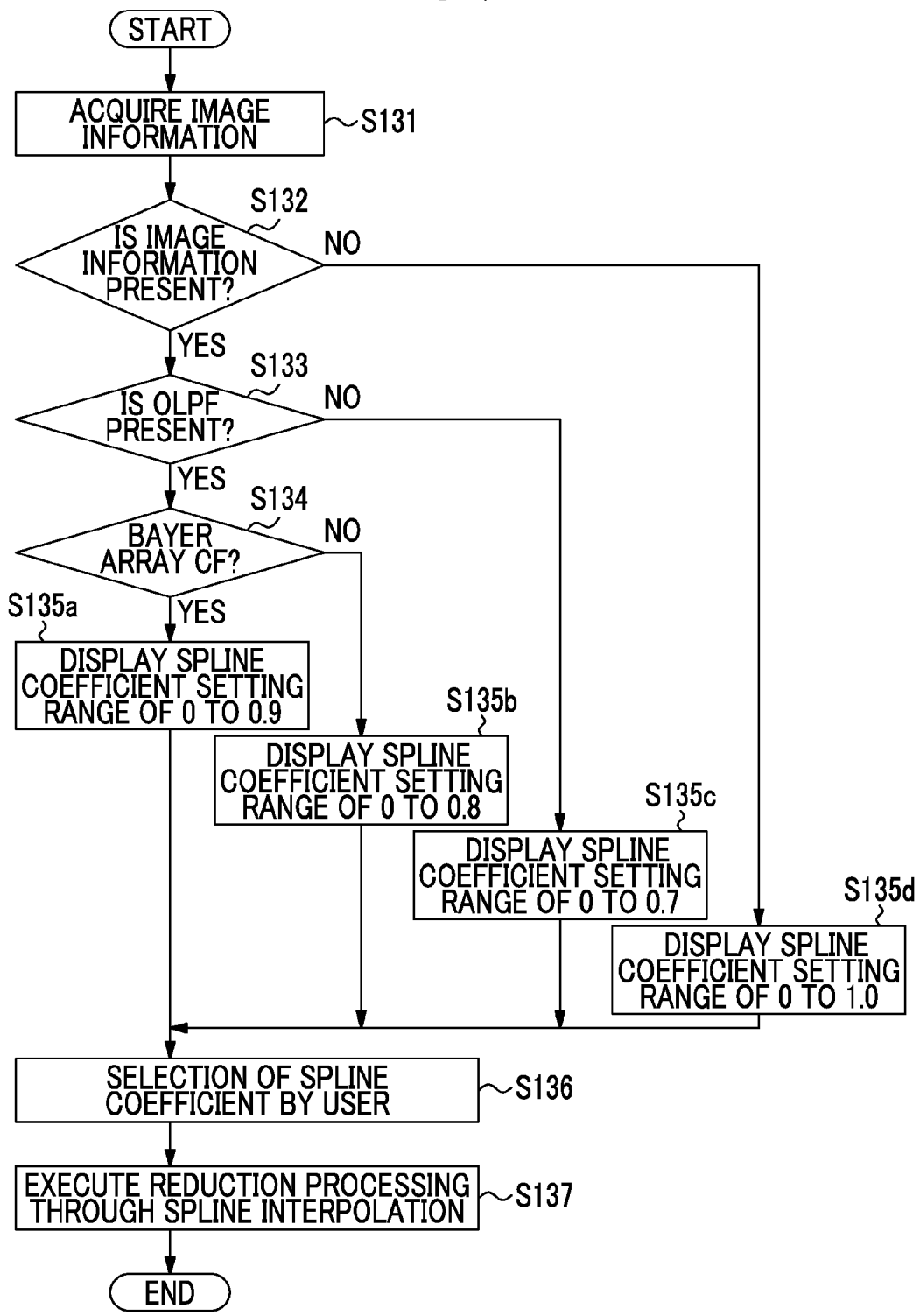

A reduction processing example according to a third embodiment will be described with reference to FIGS. 6, 9A, and 9B. FIG. 9A is a flow diagram illustrating a flow of reduction processing according to the third embodiment.

In the present embodiment, the detailed description of processes which are the same as or similar to those in the first embodiment mentioned above will not be given.

In the present embodiment, the parameter range of processing (processing B, interpolation processing) in the reduction processing is controlled by the presence or absence of the shooting condition data, the presence or absence of the optical low-pass filter, and the color filter array.

In the present embodiment, as is the case with the first embodiment, when the image capture data (no reduced image data present) 30 is input to the image reduction processing section 16, the shooting condition data 34 is acquired in the data acquisition section 70 (step S31 of FIG. 9A). In addition, the present embodiment is the same as the first embodiment (see S12 to S14 of FIG. 7A), in that the discrimination of whether the shooting condition data is included in the image capture data 30 in the reduction processing determination section 72 is performed (S32), the discrimination of the presence or absence of the optical low-pass filter (OLPF) 64 is performed (S33), and the discrimination of whether the used color filters (CF) have a Bayer array is performed (S34).

However, in the present embodiment, the selectable range (range including a plurality of selection candidates) of parameters of the processing B (interpolation processing) in the reduction processing is determined depending on the presence or absence of the shooting condition data 34, the presence or absence of the optical low-pass filter 64, and whether the used color filters have a Bayer array.

For example, when it is discriminated that the shooting condition data is not included in the image capture data 30 (NO in S32), the reduction processing determination section 72 displays a "range α" on the display section 22 as the selectable range of the processing parameter of the processing B (S35$d$). In addition, when the shooting condition data is included in the image capture data 30 (YES in S32), and it is discriminated that the optical low-pass filter 64 is not used (NO in S33), the reduction processing determination section 72 displays a "range γ" on the display section 22 as the selectable range of the processing parameter of the processing B (S35$c$). In addition, when the optical low-pass filter 64 is used (YES in S33), and it is discriminated that the array of the color filters is not a Bayer array (NO in S34), the reduction processing determination section 72 displays a "range β" on the display section 22 as the selectable range of the processing parameter of the processing B (S35$b$). On the other hand, when it is discriminated that the array of the color filters is a Bayer array (YES in S34), the reduction processing determination section 72 displays a "range α" on the display section 22 as the selectable range of the processing parameter of the processing B (S35$a$).

A user can select any parameter from selection candidates included in the selectable ranges α, β, γ, and a determined in this manner, through the selection instruction section 78. When the parameter of the processing B is selected and input by a user through the selection instruction section 78 (S36), the reduction processing section 76 performs the processing B on the basis of the parameter which is selected and inputted by the user (S37).

FIG. 9B is a flow diagram when the "spline interpolation processing in the reduction processing" is adopted as the processing B in the processing flow of FIG. 9A. Steps S131 to S137 of FIG. 9B are substantially the same as steps S31 to S37 of FIG. 9A, except that the "processing B" is replaced by the "spline interpolation processing in the reduction processing", but the ranges "α", "β", "γ" and "σ" of the processing B in FIG. 9A are set to "spline interpolation coefficient settable range of 0 to 0.9", "spline interpolation coefficient settable range of 0 to 0.8", "spline interpolation coefficient settable range of 0 to 0.7", and "spline interpolation coefficient settable range of 0 to 1.0", respectively, in FIG. 9B.

That is, when it is discriminated that the shooting condition data is not included in the image capture data 30 (NO in step S132 of FIG. 9B), the reduction processing determination section 72 sets 0 to 1.0 which is a maximum range of the spline interpolation coefficient to the settable range (S135*d*). In addition, when information of "no optical low-pass filter present" is present at the time of image capture (NO in S133), the performing of reduction as it is causes the high possibility of image degradation such as moire occurring. In addition, in the spline interpolation, as a spline interpolation coefficient value is larger, sharpness becomes higher. However, when the spline interpolation coefficient is excessively large, there is the possibility of image degradation such as moire occurring. Therefore, in this case, the reduction processing determination section 72 narrows the spline interpolation coefficient settable range, and sets the settable range of the spline interpolation coefficient to 0 to 0.7 (S135*c*). In addition, when image capture is performed by the image pickup element provided with the color filters having a array pattern shown in FIGS. 4B and 5, data of a high frequency component can be acquired as compared to those of a Bayer array. However, when reduction processing is performed as it is, there is the high possibility of image degradation such as moire occurring in the reduced image. Therefore, when the array pattern of the color filters is a pattern (such as the array pattern shown in FIGS. 4B and 5) other than a Bayer array, the reduction processing determination section 72 narrows the spline interpolation coefficient settable range, and sets the settable range of the spline interpolation coefficient to 0 to 0.8 (S135*b*). On the other hand, when the array pattern of the color filters is a "Bayer array", data free of the high frequency component is acquired as compared to the array pattern shown in FIGS. 4B and 5, and image degradation such as moire is not likely to occur. Therefore, the reduction processing determination section 72 sets the settable range of the spline interpolation coefficient to 0 to 0.9 (S135*a*).

Meanwhile, the numerical value of the spline interpolation coefficient settable range as shown in FIG. 9B is merely illustrative, and the spline interpolation coefficient settable range may be appropriately determined by other numerical values. For example, the spline interpolation coefficient settable range in each case can also be determined by other values in which the magnitude relation of numerical values does not change.

In addition, interpolation processing capable of being used at the time of the reduction processing is not limited to the spline interpolation method, and any interpolation processing can be used. For example, a nearest neighbor method, a bi-linear interpolation method, a bi-cubic convolution interpolation method, and the like which have characteristics shown in the following table may be used instead of the spline interpolation method, the setting range of the processing parameter of each interpolation method may be able to be displayed and selected instead of the above-mentioned spline interpolation coefficient settable range.

TABLE 1

| Interpolation method in resizing (reduction) | Image quality (difficulty of generation such as moire) | Calculation amount |
| --- | --- | --- |
| Nearest neighbor method | Poor | Small |
| Bi-linear interpolation method | Medium | Medium |
| Bi-cubic convolution interpolation method | Good | Large |
| Spline interpolation method | Best | Most |

As described above, according to the present embodiment, the settable range of the processing parameter (spline interpolation coefficient of the spline interpolation processing) of the processing B can be switched in accordance with the presence or absence of the optical low-pass filter and the array pattern of the color filters, and a user can arbitrarily select optimum processing regarding the generation of the reduced image data 38 based on the image capture data 32.

Fourth Embodiment

A reduction processing example according to a fourth embodiment will be described with reference to FIGS. 6 and 10. FIG. 10 is a flow diagram illustrating a flow of reduction processing according to the fourth embodiment.

In the present embodiment, the detailed description of processes which are the same as or similar to those in the above-mentioned third embodiment will not be given.

In the present embodiment, the parameter settable range of a reduction ratio in the reduction processing is controlled by the presence or absence of the shooting condition data, the presence or absence of the optical low-pass filter, and the color filter array.

In the present embodiment, as is the case with the third embodiment, when the image capture data (no reduced image data present) 30 is input to the image reduction processing section 16, the shooting condition data 34 is acquired in the data acquisition section 70 (step S41 of FIG. 10). In addition, the present embodiment is the same as the third embodiment (see S32 to S34 of FIG. 9A), in that the discrimination of whether the shooting condition data is included in the image capture data 30 in the reduction processing determination section 72 is performed (S42), the discrimination of the presence or absence of the optical low-pass filter (OLPF) 64 is performed (S43), and the discrimination of whether the used color filters (CF) have a Bayer array is performed (S44).

However, in the present embodiment, the selectable range (range including a plurality of selection candidates) of parameters of a reduction ratio in the reduction processing is determined depending on the presence or absence of the shooting condition data 34, the presence or absence of the optical low-pass filter 64, and whether the used color filters have a Bayer array.

For example, when it is discriminated that the shooting condition data is not included in the image capture data 30 (NO in S42), the reduction processing determination section 72 displays "0 to 1.0" which is a maximum range of a reduction ratio as the selectable range of a reduction ratio on the display section 22 (S45*d*). In addition, when the shooting condition data is included in the image capture data 30 (YES in S42), and it is discriminated that the optical low-pass filter 64 is not used (NO in S43), the performing of reduction as it is causes the high possibility of image degradation such as moire occurring in the reduced image. Therefore, the reduction processing determination section 72 displays the "range of 0.5 to 1.0" on the display section 22 as the selectable range of a reduction ratio (S45c). In addition, when image capture is performed by the image pickup element provided with the color filters having a array pattern shown in FIGS. 4B and 5, data of a high frequency component can be acquired as compared to those of a Bayer array. However, when reduction processing is performed as it is, there is the high possibility of image degradation such as moire occurring in the reduced image. Therefore, when the optical low-pass filter 64 is used (YES in S43), and it is discriminated that the array of the color filters is not a Bayer array (NO in S44), the reduction processing determination section 72 displays the "range of 0.3 to 1.0" on the display section 22 as the selectable range of a reduction ratio (S45b). On the other hand, when it is discriminated that the array of the color filters is a Bayer array (YES in S44), the reduction processing determination section 72 displays "0.2 to 0.9" on the display section 22 as the selectable range of a reduction ratio (S45a).

A user select any reduction ratio from selection candidates included in the selectable range determined in this manner, through the selection instruction section 78. When the reduction ratio is selected and input through the selection instruction section 78 (S46), the reduction processing section 76 performs the reduction processing on the basis of the reduction ratio which is selected and input by the user (S47).

Meanwhile, the numerical value of the reduction ratio settable range as shown in the FIG. 10 is merely illustrative, and the spline interpolation coefficient settable range may be appropriately determined by other numerical values. For example, the reduction ratio settable range in each case can also be determined by other values in which the magnitude relation of numerical values does not change.

As described above, according to the present embodiment, the settable range of a reduction ratio in the reduction processing can be switched in accordance with the presence or absence of the optical low-pass filter and the array pattern of the color filters, and a user can arbitrarily select optimum processing regarding the generation of the reduced image data 38 based on the image capture data 32.

Fifth Embodiment

Figure 11:
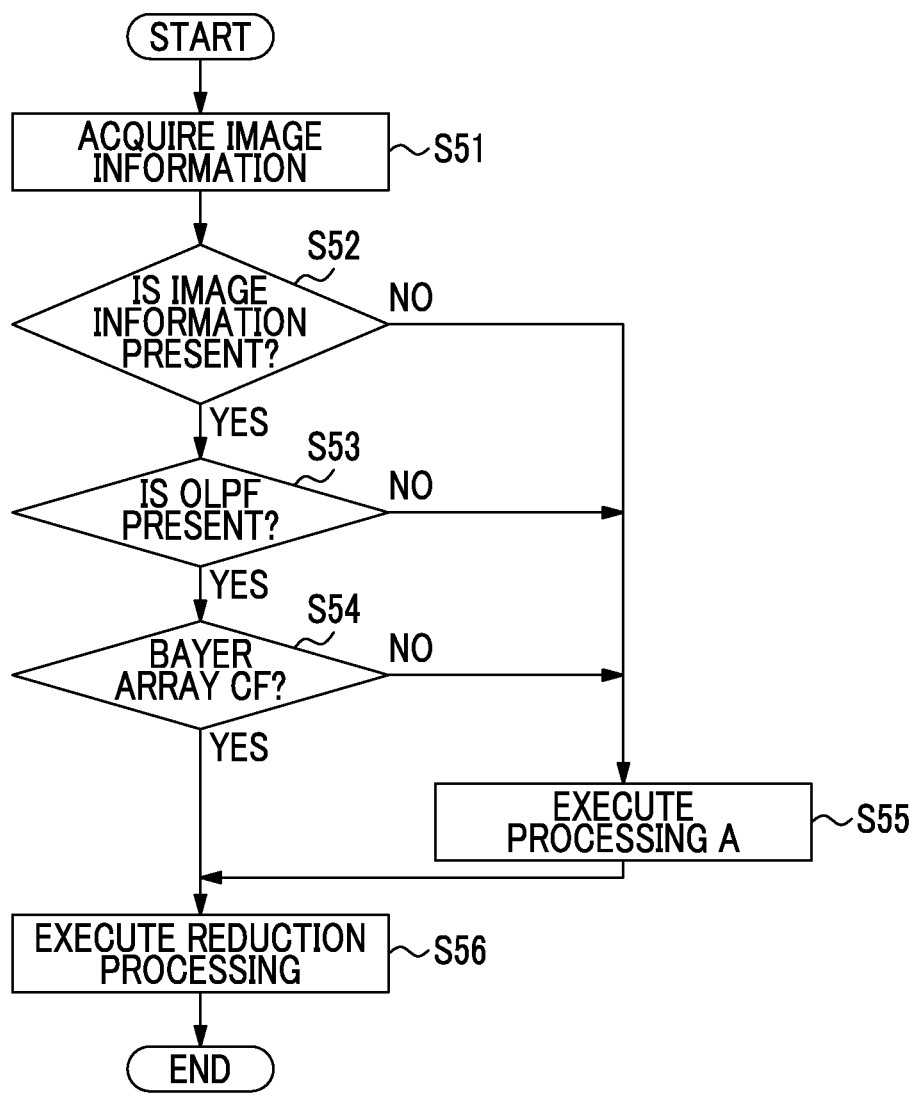
FIG. 11 is a flow diagram illustrating a flow of reduction processing according to a fifth embodiment.

A reduction processing example according to a fifth embodiment will be described with reference to FIGS. 6 and 11. FIG. 11 is a flow diagram illustrating a flow of reduction processing according to the fifth embodiment.

In the present embodiment, the detailed description of processes which are the same as or similar to those in the above-mentioned second embodiment will not be given.

The present embodiment can be applied when the image reduction processing is performed in, for example, a sensor replaceable camera, and an image pickup unit or the like is assumed in which the lens unit (image pickup section) including, for example, the lens section 48 to the image pickup element 52 in FIG. 3 can be selected and replaced from at least a first lens unit (first image pickup section) and a second lens unit (second image pickup section).

In the second embodiment (see FIG. 8A) mentioned above, whether the reduction association processing (processing A, low-pass filter processing) is executed is temporarily displayed on the display section 22, and then whether the processing A is executed is determined on the basis of the user's selection and establishment (FIG. 8A). On the other hand, in the present embodiment, whether the reduction association processing (processing A, low-pass filter processing) is executed is not displayed on the display section 22, and the reduction association processing (processing A, low-pass filter processing) is forcibly executed regardless of the user's selection and establishment.

That is, when the image capture data (no reduced image data present) 30 is input to the image reduction processing section 16, the shooting condition data 34 is acquired in the data acquisition section 70 (step S51 of FIG. 11). When the shooting condition data is included in the image capture data 30 (YES in S52), the optical low-pass filter 64 is used (YES in S53), and it is discriminated in the reduction processing determination section 72 that the used color filters have a Bayer array (YES in S54), the image reduction processing is performed in the reduction processing section 76 in a state where the processing A is not performed (S56).

On the other hand, when the shooting condition data is not included in the image capture data 30 (NO in S52), the optical low-pass filter 64 is not present (NO in S53), or it is discriminated that the used color filters do not have a Bayer array (NO in S54), the reduction association processing section 74 forcibly executes the processing A (such as low-pass filter processing) (S55), and then the reduction processing is executed in the reduction processing section 76 (S56).

Sixth Embodiment

Figure 12:
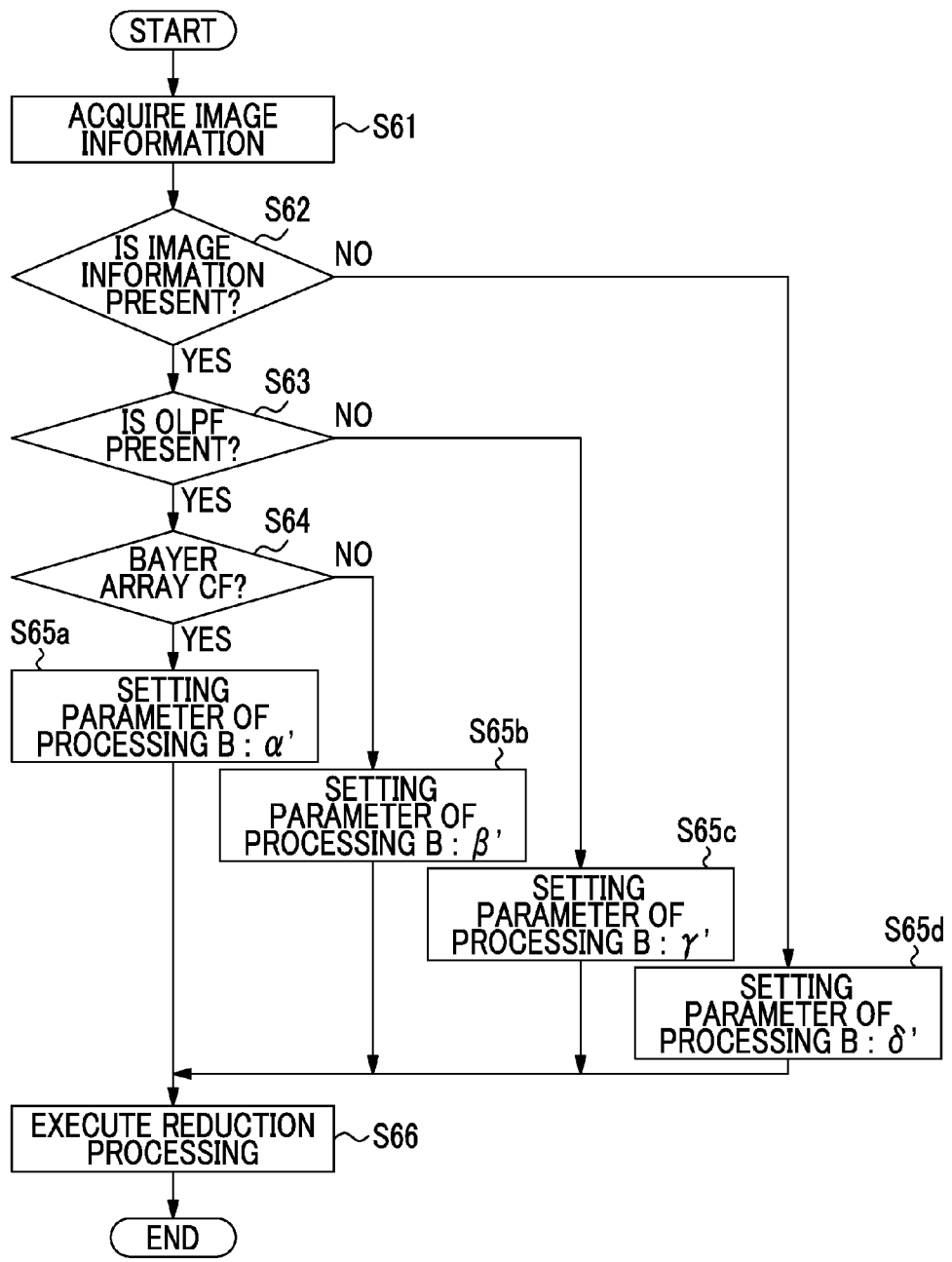
FIG. 12 is a flow diagram illustrating a flow of reduction processing according to a sixth embodiment.

A reduction processing example according to a sixth embodiment will be described with reference to FIGS. 6 and 12. FIG. 12 is a flow diagram illustrating a flow of reduction processing according to the sixth embodiment.

In the present embodiment, the detailed description of processes which are the same as or similar to those in the above-mentioned third embodiment will not be given.

In the third embodiment (see FIG. 9A) mentioned above, the parameter range of processing (processing B, spline interpolation processing) in the reduction processing is temporarily displayed on the display section 22, and then the processing B is executed on the basis of the user's selection and establishment (S36 of FIG. 9A). On the other hand, in the present embodiment, the parameter of processing (processing B, spline interpolation processing) in the reduction processing is not displayed on the display section 22, the parameter of processing (processing B, spline interpolation processing) in the reduction processing is forcibly determined regardless of the user's selection and establishment, and the processing B (reduction processing) is executed.

That is, when the image capture data (no reduced image data present) 30 is input to the image reduction processing section 16, the shooting condition data 34 is acquired in the data acquisition section 70 (step S61 of FIG. 12). When it is discriminated that the shooting condition data is not included in the image capture data 30 (NO in S62), the reduction processing determination section 72 adopts and determines "α" as the processing parameter of the processing B (S65d). In addition, when the shooting condition data is included in the image capture data 30 (YES in S62), and it is discriminated that the optical low-pass filter 64 is not used (NO in S63), the reduction processing determination section 72 adopts and determines "γ" as the processing parameter of the processing B (S65c). In addition, when the optical low-pass filter 64 is used (YES in S63), and it is discriminated that the array of the color filters is not a Bayer array (NO in S64), the reduction processing determination section 72 adopts and determines "β" as the processing parameter of the processing B (S65b). On the other hand, when it is discriminated that the array of the color filters is not a Bayer array (NO in S64), the reduction processing determination section 72 adopts and determines "α" as the processing parameter of the processing B (S65a).

The reduction processing section 76 performs the processing B (reduction processing) on the basis of the processing parameters α', β', γ', and σ' which are adopted and determined in this manner (S66).

Seventh Embodiment

Figure 13:
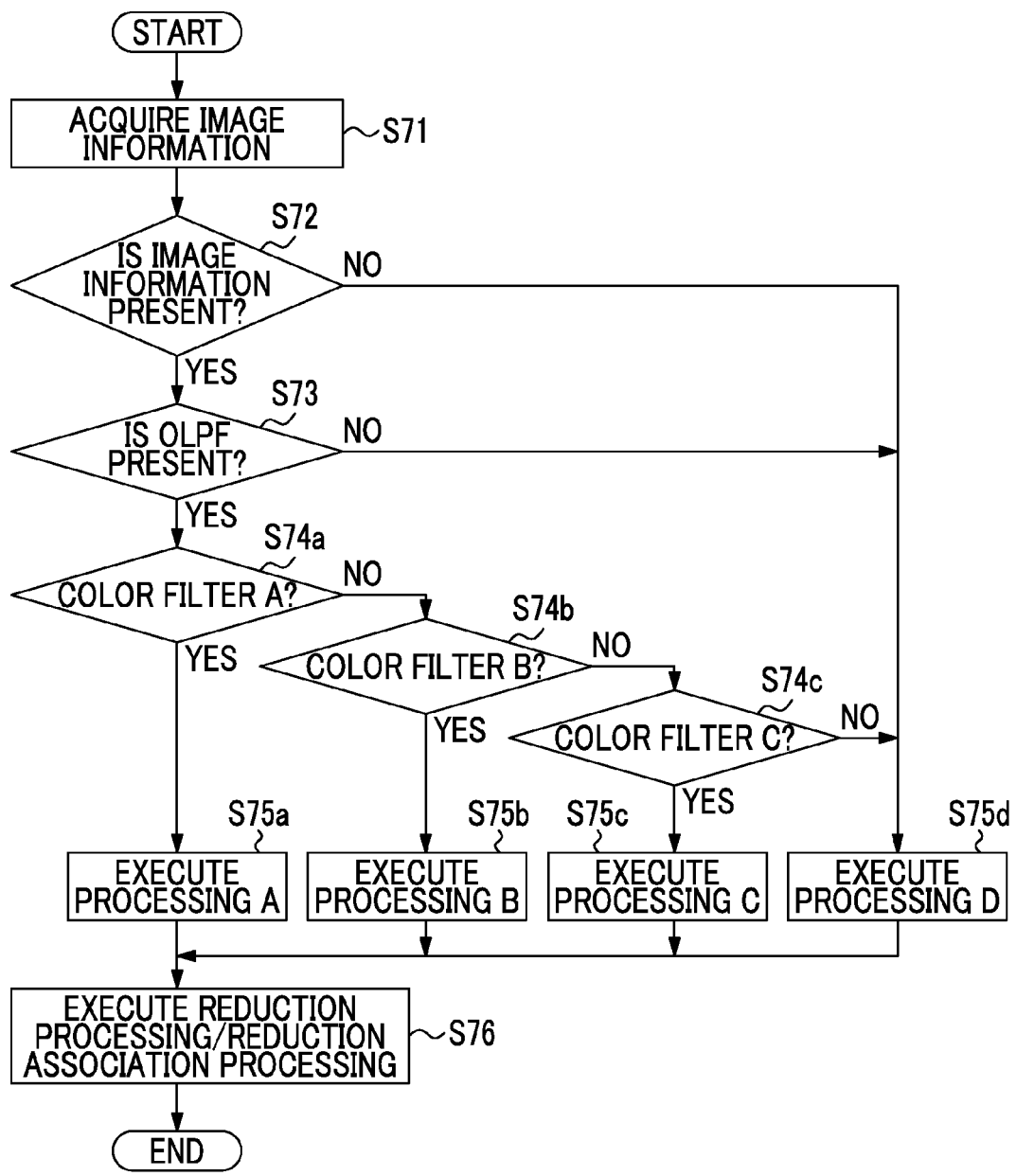
FIG. 13 is a flow diagram illustrating a flow of reduction processing according to a seventh embodiment.

A reduction processing example according to a seventh embodiment will be described with reference to FIGS. 6 and 13. FIG. 13 is a flow diagram illustrating a flow of reduction processing according to the seventh embodiment.

In the present embodiment, the detailed description of processes which are the same as or similar to those in the sixth embodiment mentioned above will not be given.

The present embodiment relates to reduction processing when it is assumed that three types of array patterns of color filters are used.

That is, when the image capture data (no reduced image data present) 30 is input to the image reduction processing section 16, the shooting condition data 34 is acquired in the data acquisition section 70 (step S71 of FIG. 13). When it is discriminated that the shooting condition data is not included in the image capture data 30 (NO in S72), the reduction processing determination section 72 determines the execution of processing D (S75d). In addition, when the shooting condition data is included in the image capture data 30 (YES in S72), and it is discriminated that the optical low-pass filter 64 is not used (NO in S73), the reduction processing determination section 72 determines the execution of the processing D (S75c).

When the optical low-pass filter 64 is used (YES in S73), and it is discriminated that the array pattern of the color filters is a pattern A (YES in S74a), the reduction processing determination section 72 determines the execution of the processing A (S75a). On the other hand, when it is discriminated that the array pattern of the color filters is not the pattern A (NO in S74a) but a pattern B (YES in S74b), the reduction processing determination section 72 determines the execution of the processing B (S75b). In addition, when it is discriminated that the array pattern of the color filters is not the pattern B (NO in S74b) but a pattern C (YES in S74c), the reduction processing determination section 72 determine the execution of processing C (S75c). when it is discriminated that the array pattern of the color filters is not the pattern C (NO in S74c), the reduction processing determination section 72 determines the execution of the processing D (S75d).

Processing is performed in the reduction association processing section 74 and the reduction processing section 76, on the basis of the processing A, the processing B, the processing C, and the processing D which are determined in this manner (S76). Meanwhile, the processing A, the processing B, the processing C, and the processing D may be the reduction association processing in the reduction association processing section 74, and may be the reduction processing in the reduction processing section 76. When the processing A, the processing B, the processing C, and the processing D are the reduction association processing in the reduction association processing section 74, preprocessing of the reduction processing can be appropriately switched. For example, the cut-off frequency of the low-pass filter processing may be determined with respect to each of the processing A, the processing B, the processing C, and the processing D. In addition, the processing A, the processing B, the processing C, and the processing D may be processing of determining the interpolation coefficient (such as the spline interpolation coefficient) of the reduction processing and the reduction ratio in the reduction processing section 76.

Eighth Embodiment

Figure 14:
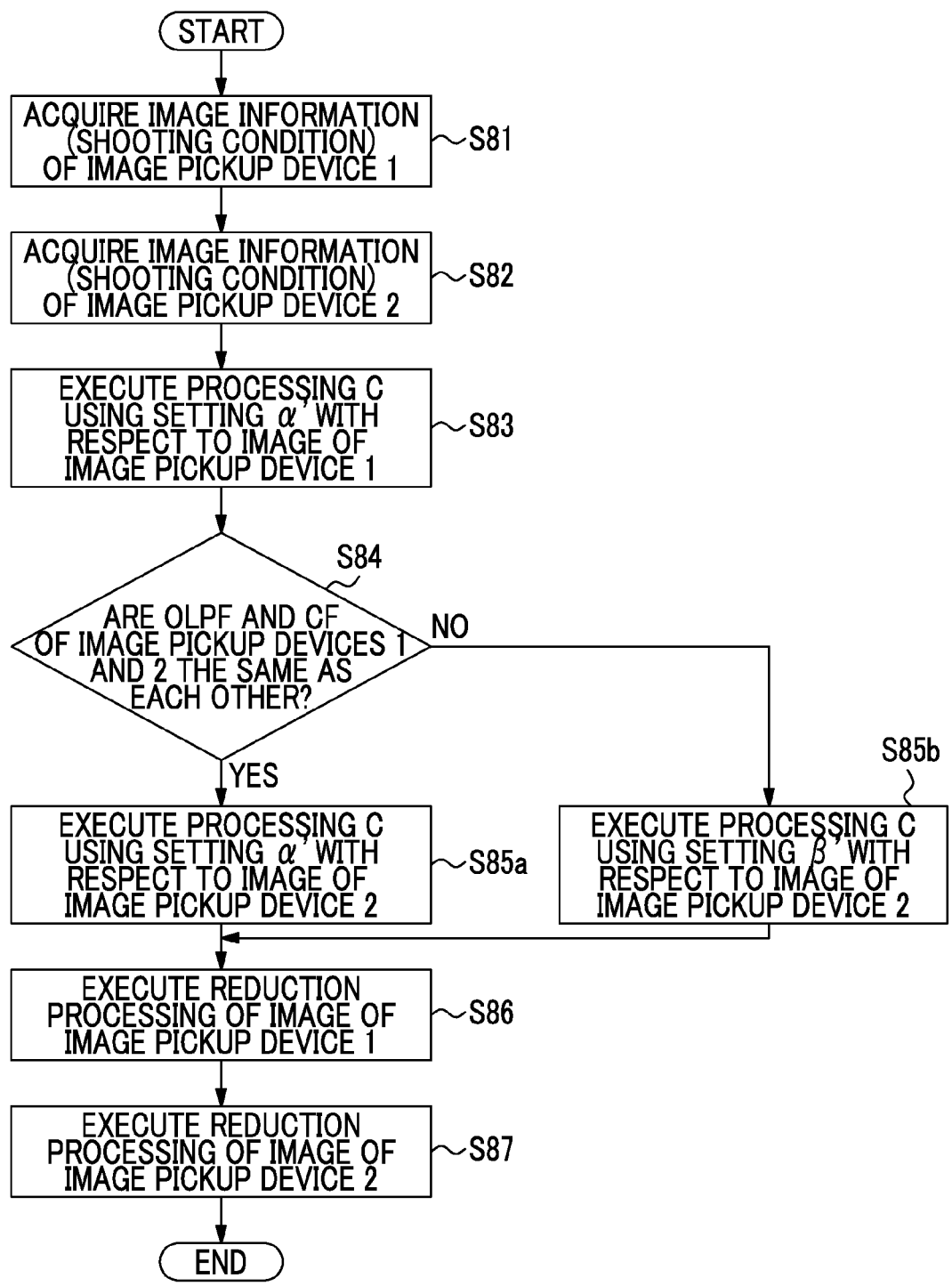
FIG. 14 is a flow diagram illustrating a flow of reduction processing according to an eighth embodiment.

A reduction processing example according to an eighth embodiment will be described with reference to FIGS. 6 and 14. FIG. 14 is a flow diagram illustrating a flow of reduction processing according to the eighth embodiment.

In the present embodiment, the detailed description of processes which are the same as or similar to those in the first embodiment mentioned above will not be given.

The present embodiment relates to the reduction processing when the image capture data 30 generated by a plurality of image pickup devices (image pickup device 1 and image pickup device 2 in the present example) is input to the image reduction processing section 16.

That is, in the present embodiment, as is the case with the first embodiment, the image capture data (no reduced image data present) 30 is input to the image reduction processing section 16, but the image capture data 30 is sent from each of the image pickup device 1 and the image pickup device 2 to the image reduction processing section 16.

The data acquisition section 70 acquires the shooting condition data 34 from the image capture data 30 of the image pickup device 1 (step S81 of FIG. 14), and acquires the shooting condition data 34 from the image capture data 30 of the image pickup device 2 (S82). In the reduction processing determination section 72, the present embodiment is the same as the first embodiment mentioned above, in that the discrimination of whether the shooting condition data is included in the image capture data 30, the discrimination of the presence or absence of the optical low-pass filter (OLPF) 64, and the discrimination of whether the used color filters (CF) have a Bayer array are performed (S12 to S14 of FIG. 7A).

The reduction processing determination section 72 discriminates the processing C (at least any of whether the reduction association processing is executed, the processing parameter of the reduction association processing, and the processing parameter of the reduction processing) so that image quality after the reduction processing between image capture data imaged and created by the image pickup device 1 and image capture data imaged and created by the image pickup device 2 falls within a predetermined allowable range.

The wording "quality of the reduced image after the reduction processing falls within a predetermined allowable range" as used herein refers to a range in which the quality of an image obtained by the reduction processing falls within a predetermined allowable range, and unit that, for example, various parameters serving as a factor for the image degradation (such as moire) of the reduced image lie within a predetermined allowable range. Such a "image quality of the reduced image" includes a spatial frequency, the amount of chroma, or the like. For example, in order to further prevent color moire, which is a phenomenon in which an image of a subject having a gray color originally is colored, from occurring, the amount of chroma is adopted as the quality of the reduced image, and whether the reduction association processing is performed, the parameter of the reduction association processing, and the parameter of the reduction processing are determined for each image pickup section (image pickup device) so that the amount of chroma falls within a predetermined allowable range. Specifically, a resolution chart is captured and acquired in advance for each of a plurality of image pickup sections, the quality of the reduced image is evaluated, and thus a reduction ratio, a processing parameter, and the like can be determined in advance for each image pickup section so that the evaluation result falls with a predetermined allowable range. Meanwhile, the term "predetermined allowable range" as used herein is not particularly limited. An appropriate range according to various requests can be adopted as the "predetermined allowable range", and the "predetermined allowable range" can be determined according to, for example, the characteristics of an image pickup element and a lens, image processing characteristics, and the like.

That is, the reduction processing determination section 72 according to the present embodiment discriminates and sets (determines) the processing parameter α' of the processing C for the image (image capture data 32) generated by the image pickup device 1 on the basis of the acquisition result of the shooting condition data of the data acquisition section 70, and the reduction association processing section 74 executes the processing C using the processing parameter α' with respect to the image generated by the image pickup device 1 (S83).

In addition, the reduction processing determination section 72 discriminates whether the shooting condition data 34 of the image (image capture data 32) generated by the image pickup device 2 on the basis of the acquisition result of the data acquisition section 70 is the same as the shooting condition data 34 of the image (image capture data 32) generated by the image pickup device 1 (S84). More specifically, regarding the presence or absence of the optical low-pass filter adopted as the shooting condition data 34 and whether the arrays of the color filters are the same as each other, the reduction processing determination section 72 discriminates whether the image generated by the image pickup device 1 and the image generated by the image pickup device 2 are the same as each other.

When it is discriminated that the shooting condition data of the image generated by the image pickup device 1 and the shooting condition data of the image generated by the image pickup device 2 are the same as each other (YES in S84), the reduction processing determination section 72 sets the processing parameter of the processing C for the image generated by the image pickup device 2 to "α'" which is the same as that of the image generated by the image pickup device 1, and the reduction association processing section 74 executes the processing C using the processing parameter α' with respect to the image generated by the image pickup device 2 (S85a).

On the other hand, when it is discriminated that the shooting condition data of the image generated by the image pickup device 1 and the shooting condition data of the image generated by the image pickup device 2 are not the same as each other (NO in S84), the reduction processing determination section 72 discriminates and sets the processing parameter of the processing C for the image generated by the image pickup device 2 to "β'" which is different from that of the image generated by the image pickup device 1, and the reduction association processing section 74 executes the processing C using the processing parameter β' with respect to the image generated by the image pickup device 2 (S85b). Meanwhile, the setting of the processing parameter β' is performed by the same reference and procedure as those of the above-mentioned processing parameter α'.

The image generated by the image pickup device 1 and the image generated by the image pickup device 2 on which the processing C is performed in this manner are then subject to the image reduction processing in the reduction processing section 76 (S86 and S87).

Meanwhile, the processing C as used herein may be the reduction association processing (such as the low-pass filter processing), and may be simply setting processing of the processing parameter (such as an interpolation coefficient or a reduction ratio) for the reduction processing in the reduction processing section 76.

As described above, according to the present embodiment, when reduced image data is generated from the image capture data 32 captured and created by a plurality of different image pickup devices, the qualities of the reduced image can be made to be equal to each other in accordance with the presence or absence of the optical low-pass filter and the array pattern of the color filters, even in a case where the image capture data 30 is acquired from any of the image pickup devices.

Meanwhile, the plurality of image pickup devices (image pickup device 1 and image pickup device 2) may be incorporated in the same device, and may be incorporated in another device.

When the plurality of image pickup devices are incorporated in the same device, it is possible to form such a configuration as, for example, the first image pickup section 12A and the second image pickup section 12B of FIG. 1B. On the other hand, when the plurality of image pickup devices are incorporated in another device, it is also possible to configure, for example, a plurality of image pickup units 10" to which the computer 11 of FIG. 1C is connected, and the qualities of the reduced image can be maintained at the same level even when the different image pickup units 10" are connected to the computer 11, thereby allowing a defect such as the sense of discomfort felt by a user to be reduced.

While preferred embodiments of the present invention have been described, the present invention is not limited to the above-mentioned embodiments, and can also be appropriately applied to other embodiments.

For example, in the above-mentioned embodiments, a digital camera has been described (see FIG. 3), but the configuration of the image capture device is not limited thereto. Another image capture device (image pickup device) to which the present invention can be applied includes, for example, a built-in or external camera for a PC, or a portable terminal device having an image capture function as described below. In addition, the the present invention can also be applied to a program causing a computer to execute the respective processing steps mentioned above.

The portable terminal device which is an embodiment of the image capture device of the present invention includes, for example, a cellular phone, a smartphone, a PDA (Personal Digital Assistants), and a portable game console. Hereinafter, a detailed description will be given by way of an example of a smartphone with reference to the accompanying drawings.

Figure 15:
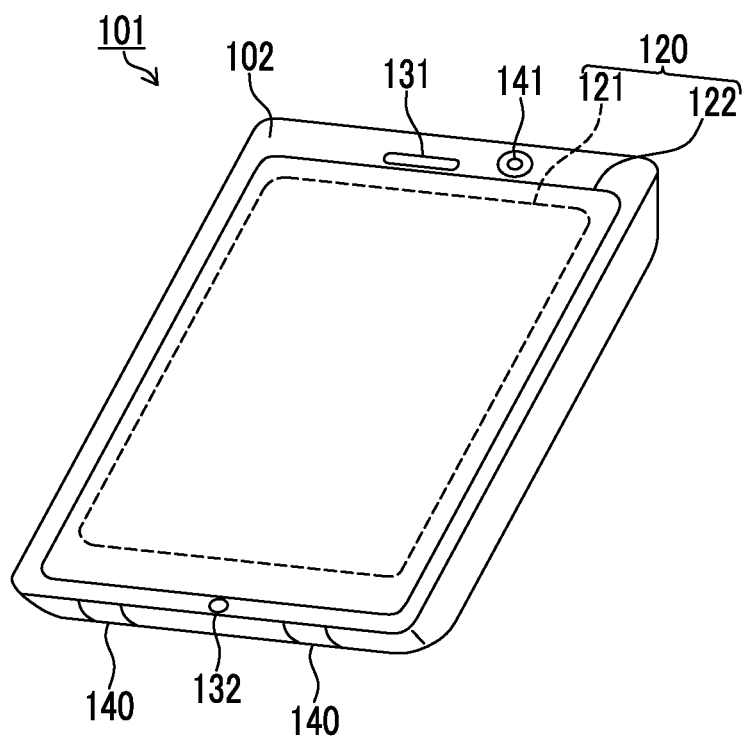
FIG. 15 is an appearance diagram of a smartphone which is an example of an image capture device of the present invention.

FIG. 15 shows an appearance of a smartphone 101 which is an embodiment of the image capture device of the present invention. The smartphone 101 shown in FIG. 15 has a plate-like housing 102, and includes a display and input section 120 in which a display panel 121 used as a display section and an operating panel 122 used as an input section are integrally formed on one surface of a housing 102. In addition, such a housing 102 includes a speaker 131, a microphone 132, an operating section 140, and a camera section 141. Meanwhile, the configuration of the housing 102 is not limited thereto, and can adopt, for example, a configuration in which the display section and the input section are independent of each other, or adopt a configuration having a folding structure or a slide mechanism.

Figure 16:
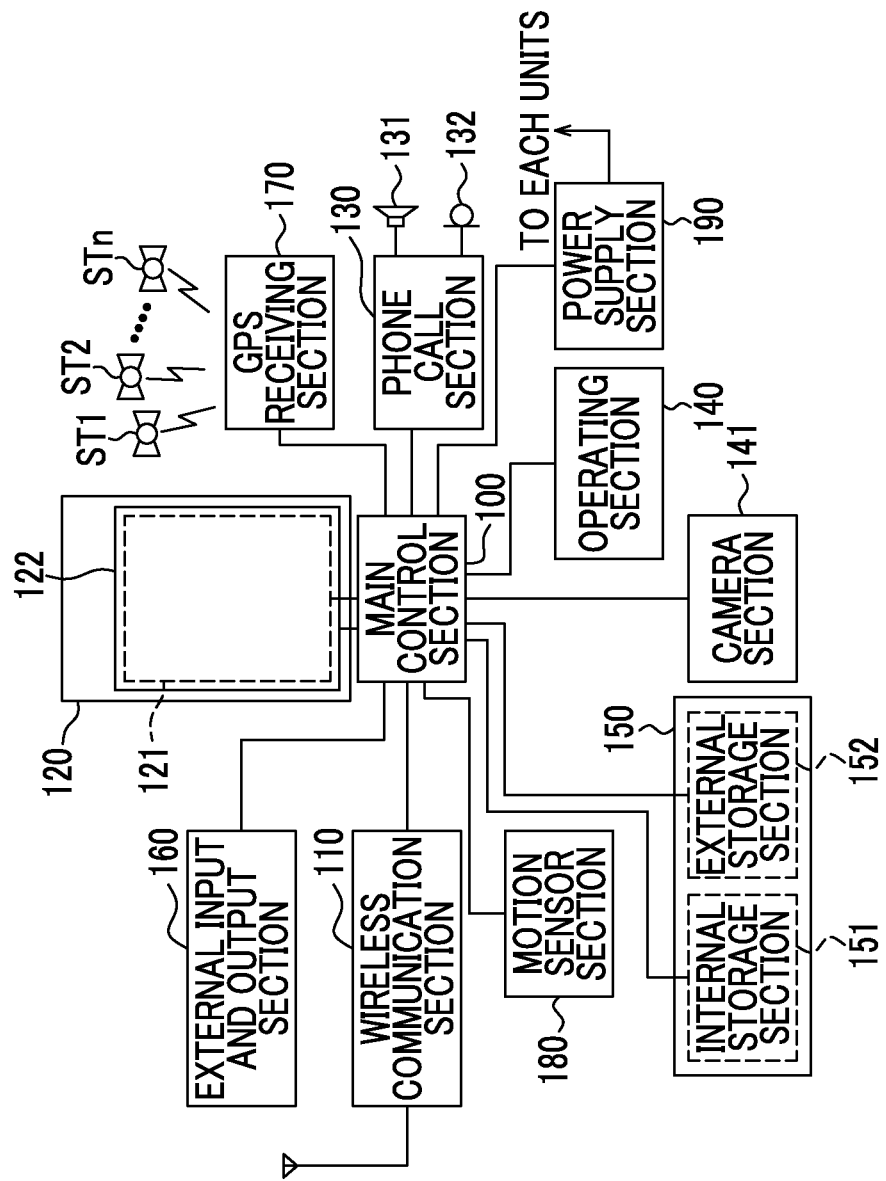
FIG. 16 is a block diagram illustrating a configuration of the smartphone shown in FIG. 15.

FIG. 16 is a block diagram illustrating a configuration of the smartphone 101 shown in FIG. 15. As shown in FIG. 16, the main component of the smartphone includes a wireless communication section 110, a display and input section 120, a phone call section 130, an operating section 140, a camera section 141, a storage section 150, an external input and output section 160, a GPS (Global Positioning System) receiving section 170, a motion sensor section 180, a power supply section 190, and a main control section 100. In addition, the main function of the smartphone 101 includes a wireless communication function of performing mobile wireless communication through a base station device BS and a mobile communication network NW.

The wireless communication section 110 performs wireless communication with respect to the base station device BS accommodated in the mobile communication network NW, according to the instructions of the main control section 100. Using such wireless communication, various file data such as voice data and image data, electronic mail data, and the like are transmitted and received, or Web data, streaming data, and the like are received.

The display and input section 120 is a so-called touch panel that visually transmits information to a user by displaying an image (still image and moving image), character information, and the like through the control of the main control section 100, and detects a user's operation for the displayed information, and includes the display panel 121 and the operating panel 122.

The display panel 121 uses an LCD (Liquid Crystal Display), an OELD (Organic Electro-Luminescence Display), and the like as a display device. The operating panel 122 is a device that visibly places an image displayed on the display surface of the display panel 121 and detects one or a plurality of coordinates operated by a user's finger or a stylus. When such a device is operated by a user's finger or a stylus, a detection signal generated due to the operation is output to the main control section 100. Next, the main control section 100 detects an operation position (coordinates) on the display panel 121 on the basis of the received detection signal.

As shown in FIG. 15, the display panel 121 and the operating panel 122 of the smartphone 101 illustrated as an embodiment the image capture device of the present invention are integrally formed to constitute the display and input section 120, but are arranged so that the operating panel 122 completely covers the display panel 121. When such an arrangement is adopted, the operating panel 122 may also have a function of detecting a user's operation in a region except for the display panel 121. In other words, the operating panel 122 may include a detection region (hereinafter, called a display region) for an overlapping portion which overlaps the display panel 121 and a detection region (hereinafter, called a non-display region) for an outer edge portion which does not overlap the display panel 121 other than that.

Meanwhile, the size of the display region and the size of the display panel 121 may be completely identical with each other, but both are not necessarily required to be identical with each other. In addition, the operating panel 122 may include an outer edge portion and two sensitive regions of an inside portion other than that. Further, the width of the outer edge portion is appropriately designed depending on the size of the housing 102, or the like. Further, a position detection system adopted in the operating panel 122 includes a matrix switch system, a resistance film system, a surface acoustic wave system, an infrared ray system, an electromagnetic induction system, an electrostatic capacitance system, or the like, and any of the systems can also be adopted.

The phone call section 130 includes the speaker 131 and the microphone 132, and converts a user's voice which is input through the microphone 132 into voice data capable of being processed by the main control section 100 to output the converted data to the main control section 100, or decodes voice data received by the wireless communication section 110 or the external input and output section 160 to output the decoded data from the speaker 131. In addition, as shown in FIG. 15, for example, the speaker 131 can be mounted on the same surface as a surface on which the display and input section 120 is provided, and the microphone 132 can be mounted on the lateral side of the housing 102.

The operating section 140 is a hardware key using a key switch or the like, and accepts instructions from a user. For example, as shown in FIG. 15, the operating section 140 is a push-button type switch, mounted on the lateral side of the housing 102 of the smartphone 101, which is turned on when the switch is held down by a finger or the like, and is turned off by the restoring force of a spring or the like when the finger is taken off the switch.

The storage section 150 stores control programs and control data of the main control section 100, application software, address data associated with names, phone numbers and the like of communications parties, data of electronic mails transmitted and received, Web data downloaded by Web browsing, and downloaded content data, and temporarily stores streaming data and the like. In addition, the storage section 150 is constituted by a smartphone built-in internal storage section 151 and an external storage section 152 having a detachable external memory slot. Meanwhile, each of the internal storage section 151 and the external storage section 152 constituting the storage section 150 is realized using a storage medium such as a flash memory type, a hard disk type, a multimedia card micro type, a card type memory (such as, for example, a MicroSD (registered trademark) memory), a RAM (Random Access Memory), a ROM (Read Only Memory), or the like.

The external input and output section 160 serves as an interface with all the external devices which are connected to the smartphone 101, and is used to be direct or indirectly connected to other external devices through communication (such as, for example, universal serial bus (USB) or IEEE 1394) or a network (such as, for example, the Internet, wireless LAN, Bluetooth (registered trademark), RFID (Radio Frequency Identification), Infrared Data Association (IrDA) (registered trademark), UWB (Ultra Wideband) (registered trademark), or ZigBee (registered trademark)).

External devices which are connected to the smartphone 101 include, for example, a wired and wireless headset, a wired and wireless external charger, a wired and wireless data port, a memory card (Memory card) or a SIM (Subscriber Identity Module Card)/UIM (User Identity Module Card) card which is connected through a card socket, an external audio and video device which is connected through an audio and video I/O (Input/Output) terminal, an external audio and video device which is wirelessly connected, a smartphone which is wired and wirelessly connected, a personal computer which is wired and wirelessly connected, a PDA which is wired and wirelessly connected, a personal computer which is wired and wirelessly connected, an earphone, and the like. The external input and output section can transmit data transmitted from such an external device to each component inside the smartphone 101, and can transmit data inside the smartphone 101 to the external device.

The GPS receiving section 170 receives GPS signals which are transmitted from GPS satellites ST1 to STn according to the instructions of the main control section 100, executes positioning arithmetic operation processing based on a plurality of received GPS signals, and detects a position which is composed of the latitude, longitude, and altitude of the smartphone 101. When position information can be acquired from the wireless communication section 110 or the external input and output section 160 (for example, wireless LAN), the GPS receiving section 170 can also detect a position using the position information.

The motion sensor section 180 includes, for example, a triaxial acceleration sensor or the like, and detects the physical motion of the smartphone 101 according to the instructions of the main control section 100. The moving direction or acceleration of the smartphone 101 is detected by detecting the physical motion of the smartphone 101. Such a detection result is output to the main control section 100.

The power supply section 190 supplies power which is stored in a battery (not shown) to each section of the smartphone 101, according to the instructions of the main control section 100.

The main control section 100 includes a microprocessor, operates according to a control program or control data which is stored by the storage section 150, and collectively controls each section of the smartphone 101. In addition, the main control section 100 has a mobile communication control function of controlling each section of a communication system and an application processing function in order to perform voice communication or data communication through the wireless communication section 110.

The application processing function is realized by the main control section 100 operating according to application software which is stored by the storage section 150. The application processing function includes, for example, an infrared communication function of controlling the external input and output section 160 to perform data communication with a counter device, an electronic mail function of transmitting and receiving an electronic mail, a Web browsing function of browsing a Web page, or the like.

In addition, the main control section 100 has an image processing function of displaying an image on the display and input section 120 on the basis of image data (data of a still image or a moving image) such as received data or downloaded streaming data. The image processing function refers to a function of displaying an image on the display and input section 120 by the main control section 100 decoding the above-mentioned image data and performing image processing on such a decoding result.

Further, the main control section 100 executes display control for the display panel 121 and operation detection control for detecting a user's operation through the operating section 140 and the operating panel 122.

By the display control being executed, the main control section 100 displays an icon for starting up application software or a software key such as a scroll bar, or displays a window for creating an electronic mail. Meanwhile, the scroll bar refers to a software key for accepting an instruction to move a display portion of an image with respect to a large image or the like which does not completely fall within the display region of the display panel 121.

In addition, by the operation detection control being executed, the main control section 100 detects a user's operation through the operating section 140, accepts an operation for the above icon or an input of a character string for an entry field of the above window through the operating panel 122, or accepts a scroll request of a display image through the scroll bar.

Further, by the operation detection control being executed, the main control section 100 determines whether the operation position for the operating panel 122 is the overlapping portion (display region) which overlaps the display panel 121 or the outer edge portion (non-display region) which does not overlap the display panel 121 other than that, and has a touch panel control function of controlling the sensitive region of the operating panel 122 and the display position of the software key.

In addition, the main control section 100 can also detect a gesture operation for the operating panel 122 to execute a preset function in accordance with the detected gesture operation. The gesture operation unit an operation of drawing a locus using a finger or the like, simultaneously designating a plurality of positions, or drawing a locus with respect to at least one position from the plurality of positions by a combination thereof, rather than a simple touch operation of the related art.

The camera section 141 is a digital camera that performs electronic image capture using an image pickup element such as CMOS (Complementary Metal Oxide Semiconductor), a CCD (Charge-Coupled Device), or the like. In addition, the camera section 141 converts image data obtained by image pickup into compressed image data such as, for example, JPEG (Joint Photographic coding Experts Group) through the control of the main control section 100, and can record the converted data in the storage section 150, or output the data through the input and output section 160 or the wireless communication section 110. In the smartphone 101 shown in FIG. 15, the camera section 141 is mounted on the same as surface as the display and input section 120, but the mounting position of the camera section 141 is not limited thereto, and may be mounted on the back surface of the display and input section 120, or a plurality of camera sections 141 may be mounted thereon. Meanwhile, when a plurality of camera sections 141 are mounted, image capture can be performed individually by switching the camera sections 141 for image capture, or image capture can also be performed using the plurality of camera section 141 simultaneously.

In addition, the camera section 141 can use various functions of the smartphone 101. For example, an image acquired in the camera section 141 can be displayed on the display panel 121, or the image of the camera section 141 can be used as one of the operation inputs of the operating panel 122. In addition, when the GPS receiving section 170 detects a position, the position can also be detected referring to the image from the camera section 141. Further, referring to the image from the camera section 141, the optical axis direction of the camera section 141 of the smartphone 101 can be determined without using a triaxial acceleration sensor, or in conjunction with the triaxial acceleration sensor, and the current usage environment can also be determined. The image from the camera section 141 can also be, of course, used within application software.

Besides, position information acquired by the GPS receiving section 170, voice information (text information may be formed by the main control section or the like performing voice-to-text conversion) acquired by the microphone 132, posture information acquired by the motion sensor section 180, or the like can be added to image data of a still image or a moving image and be recorded in the storage section 150, or can also be output through the input and output section 160 or the wireless communication section 110.

Meanwhile, in the above-mentioned smartphone 101, the camera section 141 functions as the image pickup sections (12, 12A, and 12B) of FIG. 1, the main control section 100 functions as the digital image processing sections (14, 14A, and 14B) and the image reduction processing section 16 of FIG. 1, the operating section 140 and the operating panel 122 function as the user I/F 17, the main control section 100 and the external input and output section 160 function as the input and output control section 18 of FIG. 1, the storage section 150 functions as the storage section 20 of FIG. 1, and the display panel 121 functions as the display section 22 of FIG. 1.

What is claimed is:

1. An image processing device to which image capture data including image pickup data is inputted, comprising:
   a data acquisition processor configured to discriminate whether shooting condition data is included in the image capture data to be input, and to acquires contents of the shooting condition data when it is discriminated that the shooting condition data is included in the image capture data to be input; and
   a reduction processing determination processor configured to determine whether reduction association processing associated with reduction processing of generating reduced image data from the image pickup data is executed, a processing parameter of the reduction association processing, and a processing parameter of the reduction processing, on the basis of an acquisition result of the shooting condition data by the data acquisition processor,
   wherein the shooting condition data includes information on the presence or absence of an optical low-pass filter at the time of the creation of the image pickup data and information on an array of color filters of an image pickup section used at the time of the creation of the image pickup data,
   wherein the reduction processing determination processor determines to process low-pass filter processing as the reduction association processing when moire is suppressed in a captured image represented by the image capture data according to the array of color filters, and when the moire is appeared in the reduced image after processing the reduction processing on the image pickup data, on the basis of an acquisition result of the shooting condition data.

2. The image processing device according to claim 1, when the moire is suppressed in the captured image represented by the image capture data according to the array of color filters, and when the moire is appeared in the reduced image after processing the reduction processing on the image pickup data, is that when there is a high probability of the image capture data including many high frequency components.

3. The image processing device according to claim 1 wherein the processing parameter of the reduction processing is a reduction ratio in the reduction processing.

4. The image processing device according to claim 1, wherein the processing parameter of the reduction processing is a processing parameter of interpolation processing in the reduction processing.

5. The image processing device according to claim 4, wherein the interpolation processing is based on a spline interpolation processing method, and
   the processing parameter of the interpolation processing is a spline interpolation coefficient.

6. The image processing device according to claim 1, wherein the image capture data including the image pickup data imaged and created by a plurality of image pickup sections including at least a first image pickup section and a second image pickup section is inputted to the image processing device, and
   the reduction processing determination processor determines at least any of whether the reduction association processing is executed, the processing parameter of the reduction association processing, and the processing parameter of the reduction processing so that an image quality due to the reduced image data after the reduction processing falls within a predetermined allowable range between the image capture data imaged and created by the first image pickup section and the image capture data imaged and created by the second image pickup section.

7. The image processing device according to claim 1, further comprising reduction association processing processor configured to perform the reduction association processing in accordance with a determination result of the reduction processing determination processor.

8. The image processing device according to claim 1, further comprising reduction processing processor to perform the reduction processing in accordance with the determination result of the reduction processing determination processor.

9. The image processing device according to claim 1, further comprising display processor configured to display a determination result of the reduction processing determination processor.

10. The image processing device according to claim 9, wherein the display processor selectably displays establishment of the determination result of the reduction processing determination processor regarding whether the reduction association processing is executed,
    the image processing device further includes selection processor configured to accept user's selection relating to the establishment of the determination result of the reduction processing determination processor, and
    the reduction processing determination processor establishes whether the reduction association processing is executed in accordance with a selection result accepted through the selection processor.

11. The image processing device according to claim 9, wherein the processing parameter of the reduction association processing and the processing parameter of the reduction processing which are determined by the reduction processing determination processor include a plurality of selection candidates,
    the display processor selectably displays the processing parameter of the reduction association processing and the processing parameter of the reduction processing from the plurality of selection candidates,
    the image processing device further includes selection processor configured to accept user's selection from the plurality of selection candidates, and
    the reduction processing determination processor establishes the processing parameter of the reduction association processing and the processing parameter of the reduction processing in accordance with a selection result accepted through the selection processor.

12. The image processing device according to claim 9, further comprising reduction association processing processor configured to perform the reduction association processing in accordance with whether the established reduction association processing is executed and the processing parameter of the reduction association processing.

13. The image processing device according to claim 9, further comprising reduction processing processor configured to perform the reduction processing in accordance with the processing parameter of the established reduction processing.

14. An image pickup apparatus comprising:
    an image pickup device which is provided with an image pickup section that images and creates image capture data including image pickup data; and
    the image processing device according to claim 1.

15. An image pickup apparatus comprising:
an image pickup device which is provided with a plurality of image pickup sections including at least a first image pickup section and a second image pickup section; and
the image processing device according to claim 6.

16. An image pickup apparatus comprising:
an image pickup device which is provided with an image pickup section that images and creates image capture data including image pickup data, the image pickup section being capable of selected and replaced from a plurality of image pickup sections including at least a first image pickup section and a second image pickup section; and
the image processing device according to claim 6.

17. A computer comprising the image processing device according to claim 1.

18. An image processing method using the image processing device comprising:
a data acquisition step implemented by a processor and configured to discriminate whether shooting condition data is included in image capture data including image pickup data, and to acquire contents of the shooting condition data when it is discriminated that the shooting condition data is included in the image capture data to be inputted; and
a reduction processing determination step implemented by a processor and configured to determine whether reduction association processing associated with reduction processing of generating reduced image data from the image pickup data is executed, a processing parameter of the reduction association processing, and a processing parameter of the reduction processing, on the basis of an acquisition result of the shooting condition data,
wherein the shooting condition data includes information on the presence or absence of an optical low-pass filter at the time of the creation of the image pickup data and information on an array of color filters of an image pickup section used at the time of the creation of the image pickup data,
wherein the reduction processing determination step determines to process low-pass filter processing as the reduction association processing when moire is suppressed in a captured image represented by the image capture data according to the array of color filters, and when the moire is appeared in the reduced image after processing the reduction processing on the image pickup data, on the basis of an acquisition result of the shooting condition data.

19. The image processing method according to claim 18, when the moire is suppressed in the captured image represented by the image capture data according to the array of color filters, and when the moire is appeared in the reduced image after processing the reduction processing on the image pickup data, is that when there is a high probability of the image capture data including many high frequency components.

20. A non-transitory computer readable medium storing a program causing a computer to execute the image processing method, comprising:
a procedure implemented by a processor and configured to discriminate whether shooting condition data is included in image capture data including image pickup data, and to acquire contents of the shooting condition data when it is discriminated that the shooting condition data is included in the image capture data to be inputted; and
a procedure implemented by a processor and configured to determine whether reduction association processing associated with reduction processing of generating reduced image data from the image pickup data is executed, a processing parameter of the reduction association processing, and a processing parameter of the reduction processing, on the basis of an acquisition result of the shooting condition data,
wherein the shooting condition data includes information on the presence or absence of an optical low-pass filter at the time of the creation of the image pickup data and information on an array of color filters of an image pickup section used at the time of the creation of the image pickup data,
wherein the procedure determine includes determination to process low-pass filter processing as the reduction association processing when moire is suppressed in a captured image represented by the image capture data according to the array of color filters, and the when moire is appeared in the reduced image after processing the reduction processing on the image pickup data, on the basis of an acquisition result of the shooting condition data.

21. The non-transitory computer readable medium storing the program according to claim 20, causing a computer to execute:
when the moire is suppressed in the captured image represented by the image capture data according to the array of color filters, and when the moire is appeared in the reduced image after processing the reduction processing on the image pickup data, is that when there is a high probability of the image capture data including many high frequency components.

* * * * *